(12) United States Patent
Boyce et al.

(10) Patent No.: US 9,382,461 B2
(45) Date of Patent: *Jul. 5, 2016

(54) LOW-TACK, UV-CURED PRESSURE SENSITIVE ADHESIVE SUITABLE FOR RECLOSABLE PACKAGES

(71) Applicant: Intercontinental Great Brands LLC, East Hanover, NJ (US)

(72) Inventors: Jeffrey James Boyce, Grove City, OH (US); Michael Clingerman, Hillard, OH (US); Colleen Marie Henry, Dublin, OH (US); David Chris Masterson, Grove City, OH (US); Vincent Daniel McGinniss, Columbus, OH (US)

(73) Assignee: Intercontinental Great Brands LLC, East Hanover, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/782,980

(22) Filed: Mar. 1, 2013

(65) Prior Publication Data

US 2013/0178554 A1     Jul. 11, 2013

Related U.S. Application Data

(63) Continuation of application No. 13/034,843, filed on Feb. 25, 2011, now Pat. No. 8,389,596.

(60) Provisional application No. 61/308,540, filed on Feb. 26, 2010, provisional application No. 61/407,406, filed on Oct. 27, 2010, provisional application No. 61/407,409, filed on Oct. 27, 2010.

(51) Int. Cl.
    *C09J 163/10*     (2006.01)
    *B65D 75/58*     (2006.01)
(Continued)

(52) U.S. Cl.
    CPC .......... *C09J 163/10* (2013.01); *B65D 75/5805* (2013.01); *B65D 75/5855* (2013.01);
(Continued)

(58) Field of Classification Search
    CPC .......... B65D 75/5805; B65D 75/5855; B65D 2575/586; C09J 163/10; C09J 109/00; C09J 133/00; C09J 4/06; C09J 176/16
See application file for complete search history.

(56) References Cited

U.S. PATENT DOCUMENTS

| 2,778,171 A | 1/1957 | Taunton |
| 2,954,901 A | 10/1960 | Winstead |

(Continued)

FOREIGN PATENT DOCUMENTS

| DE | 4410235 | 9/1995 |
| DE | 20113173 | 11/2001 |

(Continued)

OTHER PUBLICATIONS

European Search Report issued on Oct. 17, 2012 in European Patent Application EP06122144,6, 4 pages.

(Continued)

*Primary Examiner* — Satya Sastri
(74) *Attorney, Agent, or Firm* — Fitch, Even, Tabin & Flannery LLP

(57) ABSTRACT

UV-cured pressure sensitive adhesive including one or more UV-curable acrylic oligomers, one or more tack control components, and, optionally, an elastomeric material is described herein. The adhesive includes an adhesive component ratio of the various adhesive components effective to provide desired first peel adhesions and subsequent peel adhesions.

21 Claims, 10 Drawing Sheets

(51) Int. Cl.
*C09J 4/06* (2006.01)
*C09J 109/00* (2006.01)
*C09J 133/00* (2006.01)
*C09J 175/16* (2006.01)

(52) U.S. Cl.
CPC ............... *C09J 4/06* (2013.01); *C09J 109/00* (2013.01); *C09J 133/00* (2013.01); *B65D 2575/586* (2013.01); *C09J 175/16* (2013.01)

(56) References Cited

U.S. PATENT DOCUMENTS

| | | |
|---|---|---|
| 2,991,001 A | 7/1961 | Hughes |
| 3,154,239 A | 10/1964 | Madsen |
| 3,217,871 A | 11/1965 | Lee |
| 3,608,707 A | 9/1971 | Miller |
| 3,616,898 A | 11/1971 | Massie |
| 3,653,502 A | 4/1972 | Beaudoin |
| 3,735,918 A | 5/1973 | Tundermann |
| 3,879,492 A | 4/1975 | Bontinick |
| 3,885,977 A | 5/1975 | Lachman et al. |
| 4,058,645 A | 11/1977 | Steiner |
| 4,061,820 A | 12/1977 | Magid et al. |
| 4,082,877 A | 4/1978 | Shadle |
| 4,210,246 A | 7/1980 | Kuchenbecker |
| 4,337,862 A | 7/1982 | Suter |
| 4,361,237 A | 11/1982 | Heiremans et al. |
| 4,367,312 A | 1/1983 | Bontinck et al. |
| 4,399,249 A | 8/1983 | Bildusas |
| 4,488,647 A | 12/1984 | Davis |
| 4,506,488 A | 3/1985 | Matt |
| 4,512,479 A | 4/1985 | Hain et al. |
| 4,533,445 A | 8/1985 | Orio |
| 4,533,509 A | 8/1985 | Gust et al. |
| 4,556,595 A | 12/1985 | Ochi |
| 4,572,377 A | 2/1986 | Beckett |
| 4,576,854 A | 3/1986 | Kurahashi |
| 4,617,223 A | 10/1986 | Hiscock |
| 4,623,398 A | 11/1986 | Goodman et al. |
| 4,661,099 A | 4/1987 | von Bittera |
| 4,674,634 A | 6/1987 | Wilson |
| 4,676,394 A | 6/1987 | Hiersteiner |
| 4,696,849 A | 9/1987 | Mobley et al. |
| 4,705,174 A | 11/1987 | Goglio |
| 4,709,396 A | 11/1987 | Voshall et al. |
| 4,709,397 A | 11/1987 | Voshall et al. |
| 4,728,572 A | 3/1988 | Davis |
| 4,745,138 A | 5/1988 | Thanawalla et al. |
| 4,752,342 A | 6/1988 | Tatum et al. |
| 4,759,642 A | 7/1988 | Van Erden et al. |
| 4,771,935 A | 9/1988 | Hekal |
| 4,785,940 A | 11/1988 | Wilson |
| 4,786,190 A | 11/1988 | Van Erden et al. |
| 4,791,024 A | 12/1988 | Clerici et al. |
| 4,810,523 A | 3/1989 | Williams et al. |
| 4,810,541 A | 3/1989 | Newman et al. |
| 4,810,745 A | 3/1989 | Pike |
| 4,855,077 A | 8/1989 | Shikinami et al. |
| 4,859,521 A | 8/1989 | Pike et al. |
| 4,889,884 A | 12/1989 | Dust |
| 4,898,280 A | 2/1990 | Runge |
| 4,898,787 A | 2/1990 | Min et al. |
| 4,901,515 A | 2/1990 | McLeod |
| 4,902,142 A | 2/1990 | Lammert et al. |
| 4,902,578 A | 2/1990 | Kerr, III |
| 4,931,327 A | 6/1990 | Liu et al. |
| 4,946,728 A | 8/1990 | Ikeda et al. |
| 4,970,113 A | 11/1990 | Yamada |
| 4,982,064 A | 1/1991 | Hartman et al. |
| 5,007,143 A | 4/1991 | Herrington |
| 5,062,569 A | 11/1991 | Hekal |
| 5,064,717 A | 11/1991 | Suzuki et al. |
| 5,073,457 A | 12/1991 | Blackwell |
| 5,089,320 A | 2/1992 | Straus et al. |
| 5,134,001 A | 7/1992 | Osgood |
| 5,141,789 A | 8/1992 | Matsuzawa et al. |
| 5,145,737 A | 9/1992 | Boiron et al. |
| 5,151,318 A | 9/1992 | Strasilla |
| 5,173,344 A | 12/1992 | Hughes |
| 5,174,659 A | 12/1992 | Laske |
| 5,200,268 A | 4/1993 | Hamada |
| 5,234,730 A | 8/1993 | Lautenschlaeger |
| 5,248,715 A | 9/1993 | Gray et al. |
| 5,286,781 A | 2/1994 | Gotoh et al. |
| 5,290,842 A | 3/1994 | Sasaki et al. |
| 5,308,666 A | 5/1994 | Borchardt |
| 5,334,643 A | 8/1994 | Gage |
| 5,352,466 A | 10/1994 | Delonis |
| 5,382,472 A | 1/1995 | Yanidis |
| 5,384,341 A | 1/1995 | Itagaki |
| 5,392,986 A | 2/1995 | Beer et al. |
| 5,405,896 A | 4/1995 | Fujiki et al. |
| 5,409,115 A | 4/1995 | Barkhorn |
| 5,413,829 A | 5/1995 | Brown et al. |
| 5,437,911 A | 8/1995 | Rohrka et al. |
| 5,449,552 A | 9/1995 | Bochow et al. |
| 5,454,207 A | 10/1995 | Storandt |
| 5,460,844 A | 10/1995 | Gaylor |
| 5,473,016 A | 12/1995 | Fujii |
| 5,519,982 A | 5/1996 | Herber et al. |
| 5,527,576 A | 6/1996 | Maul et al. |
| 5,538,771 A | 7/1996 | Nakayama |
| 5,575,747 A | 11/1996 | Dais et al. |
| 5,616,400 A | 4/1997 | Zhang |
| 5,619,058 A | 4/1997 | Kim |
| 5,626,929 A | 5/1997 | Stevenson |
| 5,634,969 A | 6/1997 | Cody et al. |
| 5,639,811 A | 6/1997 | Plamthottam et al. |
| 5,662,983 A | 9/1997 | Stark |
| 5,691,052 A | 11/1997 | Jones |
| 5,706,961 A | 1/1998 | Morano |
| 5,716,698 A | 2/1998 | Schreck et al. |
| 5,725,312 A | 3/1998 | May |
| 5,733,652 A | 3/1998 | Stowman et al. |
| 5,739,087 A | 4/1998 | Dennis |
| 5,747,560 A | 5/1998 | Christiani et al. |
| 5,773,136 A | 6/1998 | Alder et al. |
| 5,780,376 A | 7/1998 | Gonzales et al. |
| 5,792,549 A | 8/1998 | Wilkie |
| 5,792,812 A | 8/1998 | Fujiki |
| 5,795,834 A | 8/1998 | Deeb et al. |
| 5,807,637 A | 9/1998 | Schumann |
| 5,814,382 A | 9/1998 | Yannuzzi, Jr. |
| 5,830,547 A | 11/1998 | MacKenzie et al. |
| 5,863,977 A | 1/1999 | Fischer |
| 5,882,749 A | 3/1999 | Jones et al. |
| 5,882,789 A | 3/1999 | Jones et al. |
| 5,885,673 A | 3/1999 | Light |
| 5,912,084 A | 6/1999 | Hausmann et al. |
| 5,924,795 A | 7/1999 | Thompson et al. |
| 5,952,420 A | 9/1999 | Senkus et al. |
| 5,958,531 A | 9/1999 | Stevenson |
| 5,972,448 A | 10/1999 | Frisk et al. |
| 5,981,650 A | 11/1999 | Zhao et al. |
| 5,993,962 A | 11/1999 | Timm et al. |
| 5,997,968 A | 12/1999 | Dries et al. |
| 6,006,913 A | 12/1999 | Ludemann et al. |
| 6,012,844 A | 1/2000 | Huseman et al. |
| 6,015,934 A | 1/2000 | Lee |
| 6,017,623 A | 1/2000 | Nakanishi |
| 6,022,612 A | 2/2000 | Wilkie |
| 6,034,163 A | 3/2000 | Barbee et al. |
| 6,036,765 A | 3/2000 | Farrow et al. |
| D423,346 S | 4/2000 | Froehlich et al. |
| 6,084,010 A | 7/2000 | Baetzold |
| 6,096,387 A | 8/2000 | Decker |
| 6,099,682 A | 8/2000 | Krampe |
| 6,117,531 A | 9/2000 | Schacht |
| 6,129,983 A | 10/2000 | Schumann |
| 6,172,156 B1 | 1/2001 | Lindquist et al. |
| 6,184,264 B1 | 2/2001 | Webster |
| 6,196,716 B1 | 3/2001 | Geyer |
| 6,199,698 B1 | 3/2001 | Hetrick et al. |
| 6,200,677 B1 | 3/2001 | Richardson et al. |

(56) References Cited

U.S. PATENT DOCUMENTS

| | | |
|---|---|---|
| 6,210,796 B1 | 4/2001 | Lobert |
| 6,210,826 B1 | 4/2001 | Dopp |
| 6,238,090 B1 | 5/2001 | Yuter |
| 6,244,748 B1 | 6/2001 | Kasai et al. |
| 6,279,297 B1 | 8/2001 | Latronico |
| 6,287,658 B1 | 9/2001 | Cosentino |
| 6,296,961 B1 | 10/2001 | Moy |
| 6,312,828 B1 | 11/2001 | Akao |
| 6,318,894 B1 | 11/2001 | Derenthal |
| 6,331,336 B1 | 12/2001 | Szonn |
| 6,351,857 B2 | 3/2002 | Slaon, III et al. |
| 6,355,732 B1 | 3/2002 | Beer |
| 6,358,576 B1 | 3/2002 | Adur et al. |
| 6,358,622 B1 | 3/2002 | Shida et al. |
| 6,359,052 B1 | 3/2002 | Trexler, Jr. et al. |
| 6,371,644 B1 | 4/2002 | Forman |
| 6,376,591 B1 | 4/2002 | Lan et al. |
| 6,384,121 B1 | 5/2002 | Barbee et al. |
| 6,388,006 B1 | 5/2002 | Fujita |
| 6,389,651 B2 | 5/2002 | Johnson |
| 6,398,412 B2 | 6/2002 | Wedi et al. |
| 6,417,262 B1 | 7/2002 | Turner et al. |
| 6,423,768 B1 | 7/2002 | Khouri |
| 6,429,235 B1 | 8/2002 | Varlemann |
| 6,436,571 B1 | 8/2002 | Passaniti |
| 6,444,742 B1 | 9/2002 | Rong et al. |
| 6,451,398 B1 | 9/2002 | Sylvester |
| 6,451,426 B2 | 9/2002 | Kong et al. |
| 6,461,044 B1 | 10/2002 | Anderson |
| 6,461,708 B1 | 10/2002 | Dronzek |
| 6,465,543 B1 | 10/2002 | Alexandre et al. |
| 6,467,957 B2 | 10/2002 | Yeager |
| 6,485,826 B1 | 11/2002 | Watanabe et al. |
| 6,486,253 B1 | 11/2002 | Gilmer et al. |
| 6,499,878 B1 | 12/2002 | Dobreski et al. |
| D470,757 S | 2/2003 | Espinel et al. |
| 6,521,678 B1 | 2/2003 | Chaiko |
| 6,521,690 B1 | 2/2003 | Ross et al. |
| 6,524,700 B2 | 2/2003 | Masuda |
| 6,541,098 B2 | 4/2003 | Venkatasanthanam et al. |
| 6,548,587 B1 | 4/2003 | Bagrodia et al. |
| 6,552,114 B2 | 4/2003 | Turner et al. |
| 6,599,622 B1 | 7/2003 | Chu et al. |
| 6,608,134 B1 | 8/2003 | Tobing |
| 6,613,831 B1 | 9/2003 | Bentley |
| 6,624,273 B1 | 9/2003 | Everaerts et al. |
| 6,630,220 B1 | 10/2003 | Veiga |
| 6,632,522 B1 | 10/2003 | Hyde et al. |
| 6,632,868 B2 | 10/2003 | Qian |
| 6,709,759 B2 | 3/2004 | Mueller et al. |
| 6,713,152 B2 | 3/2004 | Chen et al. |
| 6,713,547 B2 | 3/2004 | Barbee et al. |
| 6,723,403 B2 | 4/2004 | Ishii et al. |
| 6,723,407 B2 | 4/2004 | Dollase et al. |
| 6,743,451 B2 | 6/2004 | Rasile et al. |
| 6,767,951 B2 | 7/2004 | Nair et al. |
| 6,770,697 B2 | 8/2004 | Drewniak et al. |
| 6,777,490 B2 | 8/2004 | Mussig |
| 6,787,592 B1 | 9/2004 | Powell et al. |
| 6,815,025 B2 | 11/2004 | Kawamura et al. |
| 6,820,546 B2 | 11/2004 | Wynne |
| 6,831,123 B1 | 12/2004 | Chisholm et al. |
| 6,838,150 B2 | 1/2005 | Mazurek |
| 6,838,508 B2 | 1/2005 | Hsiao et al. |
| 6,841,241 B2 | 1/2005 | Luhmann et al. |
| 6,844,079 B2 | 1/2005 | Holzer et al. |
| 6,844,389 B2 | 1/2005 | Mehta |
| 6,849,313 B2 | 2/2005 | Mechelaere et al. |
| 6,852,422 B2 | 2/2005 | Kendall et al. |
| 6,863,646 B2 | 3/2005 | Kinigakis et al. |
| 6,884,207 B2 | 4/2005 | Pokusa |
| 6,896,956 B2 | 5/2005 | Kong |
| 6,913,809 B2 | 7/2005 | Wolak |
| 6,929,400 B2 | 8/2005 | Razeti |
| 6,979,379 B2 | 12/2005 | White, II |
| 6,991,375 B2 | 1/2006 | Clune et al. |
| 7,135,508 B2 | 11/2006 | Chaiko et al. |
| 7,141,293 B2 | 11/2006 | Peiffer et al. |
| 7,157,516 B2 | 1/2007 | Chaiko |
| 7,163,720 B1 | 1/2007 | Dhaler |
| 7,165,888 B2 | 1/2007 | Rodick |
| 7,166,656 B2 | 1/2007 | Majumdar et al. |
| 7,186,452 B2 | 3/2007 | Peiffer et al. |
| 7,189,781 B2 | 3/2007 | Acevedo et al. |
| 7,205,040 B2 | 4/2007 | Peiffer et al. |
| D541,667 S | 5/2007 | Pokusa et al. |
| D541,668 S | 5/2007 | Pokusa et al. |
| D541,669 S | 5/2007 | Pokusa et al. |
| 7,211,306 B2 | 5/2007 | Peiffer et |
| 7,211,613 B2 | 5/2007 | Lorah |
| 7,244,223 B2 | 7/2007 | Hartman |
| 7,267,858 B2 | 9/2007 | Ono et al. |
| 7,268,173 B2 | 9/2007 | Graichen et al. |
| 7,311,973 B2 | 12/2007 | Bolte |
| 7,329,439 B2 | 2/2008 | Sachdev et al. |
| 7,329,453 B2 | 2/2008 | Peiffer et al. |
| 7,351,470 B2 | 4/2008 | Draheim |
| 7,354,635 B2 | 4/2008 | Malfait et al. |
| 7,368,165 B2 | 5/2008 | Sankey et al. |
| 7,368,496 B2 | 5/2008 | Kim et al. |
| 7,371,793 B2 | 5/2008 | Gong et al. |
| 7,393,581 B2 | 7/2008 | Kim et al. |
| 7,396,578 B2 | 7/2008 | Peiffer et al. |
| 7,399,263 B2 | 7/2008 | Hartman |
| 7,413,800 B2 | 8/2008 | Wood, Jr. et al. |
| 7,415,428 B2 | 8/2008 | Garwood |
| 7,491,434 B2 | 2/2009 | Khandpur |
| 7,495,051 B2 | 2/2009 | Nelson et al. |
| 7,665,895 B2 | 2/2010 | Takita |
| 7,740,923 B2 | 6/2010 | Exner et al. |
| 7,892,391 B2 | 2/2011 | Kendig et al. |
| 8,389,596 B2 * | 3/2013 | Boyce et al. ............ 522/184 |
| 8,398,306 B2 | 3/2013 | Kinigakis |
| 8,485,728 B2 | 7/2013 | Bowers |
| 8,763,890 B2 * | 7/2014 | Clark et al. .......... 229/120.09 |
| 2001/0012557 A1 | 8/2001 | Willham et al. |
| 2001/0019765 A1 | 9/2001 | Kiuchi |
| 2001/0021451 A1 | 9/2001 | Tokunaga et al. |
| 2001/0035593 A1 | 11/2001 | Peiffer et al. |
| 2001/0039302 A1 | 11/2001 | Wustling |
| 2001/0049414 A1 | 12/2001 | Muller et al. |
| 2001/0055679 A1 | 12/2001 | Schumann et al. |
| 2002/0009563 A1 | 1/2002 | Kawamura et al. |
| 2002/0028335 A1 | 3/2002 | Fujiki et al. |
| 2002/0098347 A1 | 7/2002 | Szonn |
| 2002/0114948 A1 | 8/2002 | Schumann |
| 2002/0122977 A1 | 9/2002 | Fujimatsu et al. |
| 2002/0137834 A1 | 9/2002 | Barbee et al. |
| 2002/0160037 A1 | 10/2002 | Ahrens |
| 2002/0165306 A1 | 11/2002 | Gilmer et al. |
| 2002/0193494 A1 | 12/2002 | Gilmer et al. |
| 2003/0013796 A1 | 1/2003 | Turner et al. |
| 2003/0072957 A1 | 4/2003 | Lee et al. |
| 2003/0082370 A1 | 5/2003 | Husemann et al. |
| 2003/0091763 A1 | 5/2003 | Ferri |
| 2003/0096108 A1 | 5/2003 | Mussig et al. |
| 2003/0100656 A1 | 5/2003 | Majumdar et al. |
| 2003/0103690 A1 | 6/2003 | Schneider et al. |
| 2003/0118759 A1 | 6/2003 | Yoshikawa et al. |
| 2003/0138624 A1 | 7/2003 | Burmeister |
| 2003/0144398 A1 | 7/2003 | Cody et al. |
| 2003/0152735 A1 | 8/2003 | Koike |
| 2003/0180530 A1 | 9/2003 | Otten et al. |
| 2003/0209453 A1 | 11/2003 | Herman |
| 2003/0211308 A1 | 11/2003 | Khandpur |
| 2003/0219585 A1 | 11/2003 | Yamanaka et al. |
| 2003/0219612 A1 | 11/2003 | Massey |
| 2003/0235664 A1 | 12/2003 | Merical et al. |
| 2004/0007319 A1 | 1/2004 | Squier et al. |
| 2004/0031798 A1 | 2/2004 | Fox et al. |
| 2004/0038040 A1 | 2/2004 | Schumann |
| 2004/0052993 A1 | 3/2004 | Dawes |
| 2004/0063841 A1 | 4/2004 | Gilmer et al. |
| 2004/0067284 A1 | 4/2004 | Sankey et al. |

(56) References Cited

U.S. PATENT DOCUMENTS

| | | |
|---|---|---|
| 2004/0067294 A1 | 4/2004 | Pedrick et al. |
| 2004/0081780 A1 | 4/2004 | Goldman |
| 2004/0097630 A1 | 5/2004 | Whitman et al. |
| 2004/0106693 A1* | 6/2004 | Kauffman et al. ............ 522/184 |
| 2004/0132906 A1 | 7/2004 | Guerin et al. |
| 2004/0142193 A1 | 7/2004 | Husemann et al. |
| 2004/0161178 A1 | 8/2004 | Olechowski |
| 2004/0180197 A1 | 9/2004 | Everaerts et al. |
| 2004/0191438 A1 | 9/2004 | Cosentino et al. |
| 2004/0219336 A1 | 11/2004 | Sano |
| 2005/0019382 A1 | 1/2005 | Kummer |
| 2005/0031233 A1 | 2/2005 | Varanese et al. |
| 2005/0041888 A1 | 2/2005 | Matsuzawa et al. |
| 2005/0042468 A1 | 2/2005 | Peiffer et al. |
| 2005/0063619 A1 | 3/2005 | Kinigakis et al. |
| 2005/0074619 A1 | 4/2005 | Peiffer et al. |
| 2005/0121822 A1 | 6/2005 | Peiffer et al. |
| 2005/0137310 A1 | 6/2005 | Gupta et al. |
| 2005/0170086 A1 | 8/2005 | Tynan |
| 2005/0182186 A1 | 8/2005 | Gielens et al. |
| 2005/0208282 A1 | 9/2005 | Wood, Jr. et al. |
| 2005/0209356 A1 | 9/2005 | Erickson |
| 2005/0217558 A1 | 10/2005 | Fitzer et al. |
| 2005/0249903 A1 | 11/2005 | Kendig et al. |
| 2005/0249906 A1 | 11/2005 | Sankey et al. |
| 2005/0266257 A1 | 12/2005 | Lee et al. |
| 2005/0266582 A1 | 12/2005 | Modlin |
| 2005/0276940 A1 | 12/2005 | Stevenson |
| 2005/0282942 A1 | 12/2005 | D'Sidocky et al. |
| 2005/0282948 A1 | 12/2005 | Li et al. |
| 2006/0029300 A1 | 2/2006 | Yoder |
| 2006/0046595 A1 | 3/2006 | Imaizumi et al. |
| 2006/0062955 A1 | 3/2006 | Liu et al. |
| 2006/0074167 A1 | 4/2006 | Nelson et al. |
| 2006/0094810 A1 | 5/2006 | Kim et al. |
| 2006/0094811 A1 | 5/2006 | Kim et al. |
| 2006/0111499 A1 | 5/2006 | Kim et al. |
| 2006/0121224 A1 | 6/2006 | Kim et al. |
| 2006/0122311 A1 | 6/2006 | Kim et al. |
| 2006/0122312 A1 | 6/2006 | Kim et al. |
| 2006/0128867 A1 | 6/2006 | Marx et al. |
| 2006/0141183 A1 | 6/2006 | Williamson et al. |
| 2006/0141241 A1 | 6/2006 | Carespodi et al. |
| 2006/0172098 A1 | 8/2006 | Stevenson |
| 2006/0173124 A1 | 8/2006 | Paul et al. |
| 2006/0199890 A1 | 9/2006 | Fasulo et al. |
| 2006/0205916 A1 | 9/2006 | Takekoshi et al. |
| 2006/0211804 A1 | 9/2006 | Kim et al. |
| 2006/0222797 A1 | 10/2006 | Bekele |
| 2006/0228057 A1 | 10/2006 | Newrones et al. |
| 2006/0234047 A1 | 10/2006 | Wenninger |
| 2006/0240204 A1 | 10/2006 | Ling et al. |
| 2006/0240209 A1 | 10/2006 | Sano |
| 2006/0257640 A1 | 11/2006 | Schumann |
| 2006/0269707 A1 | 11/2006 | Berbert |
| 2006/0292378 A1 | 12/2006 | Mgaya |
| 2007/0078212 A1 | 4/2007 | Kim et al. |
| 2007/0104395 A1 | 5/2007 | Kinigakis et al. |
| 2007/0116914 A1 | 5/2007 | Koike |
| 2007/0135563 A1 | 6/2007 | Simmons |
| 2007/0158023 A1 | 7/2007 | Miyake |
| 2007/0179254 A1 | 8/2007 | Wang et al. |
| 2007/0196610 A1 | 8/2007 | O'Rourke |
| 2007/0199481 A1 | 8/2007 | Roelofs |
| 2007/0213464 A1 | 9/2007 | Zollner et al. |
| 2007/0267737 A1 | 11/2007 | Chen et al. |
| 2007/0282064 A1 | 12/2007 | Dollase |
| 2008/0081186 A1 | 4/2008 | Ellringmann |
| 2008/0118688 A1 | 5/2008 | Kinigakis et al. |
| 2008/0131636 A1 | 6/2008 | Kinigakis et al. |
| 2008/0151031 A1 | 6/2008 | Kobayashi |
| 2008/0152850 A1 | 6/2008 | Patterson |
| 2008/0159666 A1 | 7/2008 | Exner et al. |
| 2008/0160293 A1 | 7/2008 | Arimitsu et al. |
| 2008/0176980 A1 | 7/2008 | Torkelson et al. |
| 2008/0206417 A1 | 8/2008 | Kirsch et al. |
| 2008/0223007 A1 | 9/2008 | Friebe et al. |
| 2008/0255296 A1 | 10/2008 | Gibbons et al. |
| 2008/0262126 A1 | 10/2008 | Fleischer et al. |
| 2008/0281038 A1 | 11/2008 | Takahashi |
| 2009/0036580 A1 | 2/2009 | Qian et al. |
| 2009/0043024 A1 | 2/2009 | Brunelle et al. |
| 2009/0048398 A1 | 2/2009 | Zollner et al. |
| 2009/0053388 A1 | 2/2009 | Powers |
| 2009/0053445 A1 | 2/2009 | Trent et al. |
| 2009/0061137 A1 | 3/2009 | Konrad et al. |
| 2009/0061138 A1 | 3/2009 | Peiffer et al. |
| 2009/0098327 A1 | 4/2009 | Buchbinder et al. |
| 2009/0098375 A1 | 4/2009 | Voisin et al. |
| 2009/0186220 A1 | 7/2009 | Palasz |
| 2009/0279813 A1 | 11/2009 | Pokusa |
| 2010/0092793 A1 | 4/2010 | Aithani et al. |
| 2010/0178394 A1 | 7/2010 | Exner et al. |
| 2010/0239721 A1 | 9/2010 | Stoppello et al. |
| 2011/0068040 A1 | 3/2011 | Kendig et al. |
| 2011/0143133 A1 | 6/2011 | Kinigakis |

FOREIGN PATENT DOCUMENTS

| | | |
|---|---|---|
| DE | 102005013585 | 9/2006 |
| EP | 0290147 | 9/1988 |
| EP | 0338304 | 10/1989 |
| EP | 0340339 A2 | 11/1989 |
| EP | 0411191 A1 | 2/1991 |
| EP | 0427512 A1 | 5/1991 |
| EP | 0427513 A1 | 5/1991 |
| EP | 0439941 | 8/1991 |
| EP | 0516276 | 2/1992 |
| EP | 0512191 A2 | 11/1992 |
| EP | 0537951 A1 | 4/1993 |
| EP | 0539099 | 4/1993 |
| EP | 0542449 A1 | 5/1993 |
| EP | 0546383 A1 | 6/1993 |
| EP | 0602731 A2 | 6/1994 |
| EP | 0684970 | 12/1995 |
| EP | 0772553 | 5/1997 |
| EP | 0802044 | 10/1997 |
| EP | 0806138 A1 | 11/1997 |
| EP | 0848726 | 6/1998 |
| EP | 1010632 | 6/2000 |
| EP | 1010638 | 6/2000 |
| EP | 1080881 | 3/2001 |
| EP | 1144494 | 10/2001 |
| EP | 1164087 | 12/2001 |
| EP | 1177245 | 2/2002 |
| EP | 1232960 | 8/2002 |
| EP | 1281623 | 2/2003 |
| EP | 1288139 | 3/2003 |
| EP | 1344642 | 9/2003 |
| EP | 1356925 | 10/2003 |
| EP | 1460117 | 9/2004 |
| EP | 1475229 | 11/2004 |
| EP | 1496085 | 1/2005 |
| EP | 1529799 | 5/2005 |
| EP | 1541480 A1 | 6/2005 |
| EP | 1591236 | 11/2005 |
| EP | 1642914 | 5/2006 |
| EP | 1676785 | 7/2006 |
| EP | 1714895 | 10/2006 |
| EP | 1733640 | 12/2006 |
| EP | 1739024 | 1/2007 |
| EP | 1767111 A2 | 3/2007 |
| EP | 1785447 | 5/2007 |
| EP | 1842792 A1 | 10/2007 |
| EP | 1905584 | 2/2008 |
| EP | 2042139 A2 | 4/2009 |
| EP | 2045304 A2 | 4/2009 |
| EP | 2090600 | 8/2009 |
| EP | 2319765 | 5/2011 |
| FR | 2150897 | 4/1973 |
| FR | 2769867 | 4/1999 |
| FR | 2783512 | 3/2000 |
| GB | 1423548 | 2/1976 |
| GB | 2339187 A | 1/2000 |

(56) References Cited

FOREIGN PATENT DOCUMENTS

| | | |
|---|---|---|
| JP | 59018774 | 1/1984 |
| JP | 05221454 | 8/1993 |
| JP | 6072078 | 3/1994 |
| JP | 10146931 | 6/1998 |
| JP | 11035907 | 2/1999 |
| JP | 2000198170 | 7/2000 |
| JP | 200395285 | 4/2003 |
| JP | 2003095285 | 4/2003 |
| JP | 2005041544 | 2/2005 |
| JP | 2005280736 | 10/2005 |
| JP | 2006315385 | 11/2006 |
| RU | 2237689 | 10/2004 |
| RU | 2244668 | 1/2005 |
| WO | 9516743 | 6/1995 |
| WO | 9604178 | 2/1996 |
| WO | 9742258 | 11/1997 |
| WO | 9748554 | 12/1997 |
| WO | 9800471 | 1/1998 |
| WO | 9952972 | 10/1999 |
| WO | 0034372 | 6/2000 |
| WO | 0039200 | 7/2000 |
| WO | 0058167 | 10/2000 |
| WO | 0187566 | 11/2001 |
| WO | 0222729 | 3/2002 |
| WO | 0226579 | 4/2002 |
| WO | 0226579 A1 | 4/2002 |
| WO | 03011961 | 2/2003 |
| WO | 03035391 | 5/2003 |
| WO | 03040199 | 5/2003 |
| WO | 03091020 | 11/2003 |
| WO | 2004080808 | 9/2004 |
| WO | 2005005276 | 1/2005 |
| WO | 2005014406 | 2/2005 |
| WO | 2005040268 | 5/2005 |
| WO | 2005056644 | 6/2005 |
| WO | 2005110885 A2 | 11/2005 |
| WO | 2005116132 | 12/2005 |
| WO | 2006009360 | 1/2006 |
| WO | 2006045896 | 5/2006 |
| WO | 2006058952 | 6/2006 |
| WO | 2006071833 | 7/2006 |
| WO | 2006100084 | 9/2006 |
| WO | 2006111177 | 10/2006 |
| WO | 2007009200 | 1/2007 |
| WO | 2007012805 | 2/2007 |
| WO | 2007019142 | 2/2007 |
| WO | 2007027423 | 3/2007 |
| WO | 2007090265 | 8/2007 |
| WO | 2007093798 | 8/2007 |
| WO | 2007106671 | 9/2007 |
| WO | 2007115310 | 10/2007 |
| WO | 2007121048 | 10/2007 |
| WO | 2007121049 | 10/2007 |
| WO | 2007123582 | 11/2007 |
| WO | 2007130755 | 11/2007 |
| WO | 2007146390 | 12/2007 |
| WO | 2008043750 | 4/2008 |
| WO | 2008053205 | 5/2008 |
| WO | 2008115693 | 9/2008 |
| WO | 2008127485 | 10/2008 |
| WO | 2010088492 | 8/2010 |
| ZW | 2894 | 5/1994 |

OTHER PUBLICATIONS

European Search Report issued on Oct. 18, 2012 in European Patent Application EP10184281.3, 6 pages.
European Search Report issued on Oct. 18, 2012 in European Patent Application EP10184331.6, 7 pages.
Bentley, D.; About Cold Seal Adhesives, Paper, Film and Foil Converter, Jan. 1, 2006, Internet Printout; 4 pgs.
Dow Introduces HYPOD Polyolefin Dispersions, Midland, Michigan, Jul. 11, 2007, [online]. Retrieved from the Internet: http://news.dow.com/prodbus/20070711b.htm; 2 pgs.
European Patent Office European Search Report and Written Opinion, dated Jan. 14, 2008; EP Application No. 07115566.7; 9 pgs.
European Patent Office Extended European Search Report and Written Opinion, dated Apr. 4, 2011; EP Application No. 11156091.8; 4 pgs.
European Patent Office Extended European Search Report and Written Opinion, dated Apr. 4, 2011; EP Application No. 11156092.6; 5 pgs.
European Patent Office Extended European Search Report and Written Opinion, dated Apr. 4, 2011; EP Application No. 11156093.4; 5 pgs.
European Patent Office Extended European Search Report, dated Mar. 5, 2007; EP Application No. 06122144.6; 8 pgs.
European Patent Office, Notification of Transmittal of the International Search Report and the Written Opinion of the International Searching Authority for International Application No. PCT/US2009/042998 dated Aug. 6, 2009; 12 pgs.
Kuusipalo, J.; Re-sealing Studies of Cold Seal Latexes for Paper Based Packages; Finnish Paper and Wood Journal Ltd., 2000, vol. 82, No. 3, pp. 189-192.
Notice of Opposition filed by Opponent BASF in the European Patent Office; EP Patent No. 1939106; dated Dec. 8, 2009; 6 pgs.
Notice of Opposition filed by Opponent Cadbury in the European Patent Office; EP Patent No. 1939106; dated Dec. 3, 2009; 5 pgs.
Notice of Opposition filed by Opponent Ritter in the European Patent Office; EP Patent No. 1939106; dated Nov. 26, 2009; 14 pgs.
PCT International Search Report, dated Mar. 25, 2009; PCT/US2009/33677; 3 pgs.
Response to Notice of Opposition, dated Jul. 21, 2010; EP Patent No. 1939106; 12 pgs.
The International Bureau of WIPO, Notification Concerning Transmittal of International Preliminary Report on Patentability (Chapter 1 of the Patent Cooperation Treaty) for International Application No. PCT/US2009/042998 dated Nov. 18, 2010; 7 pgs.

* cited by examiner

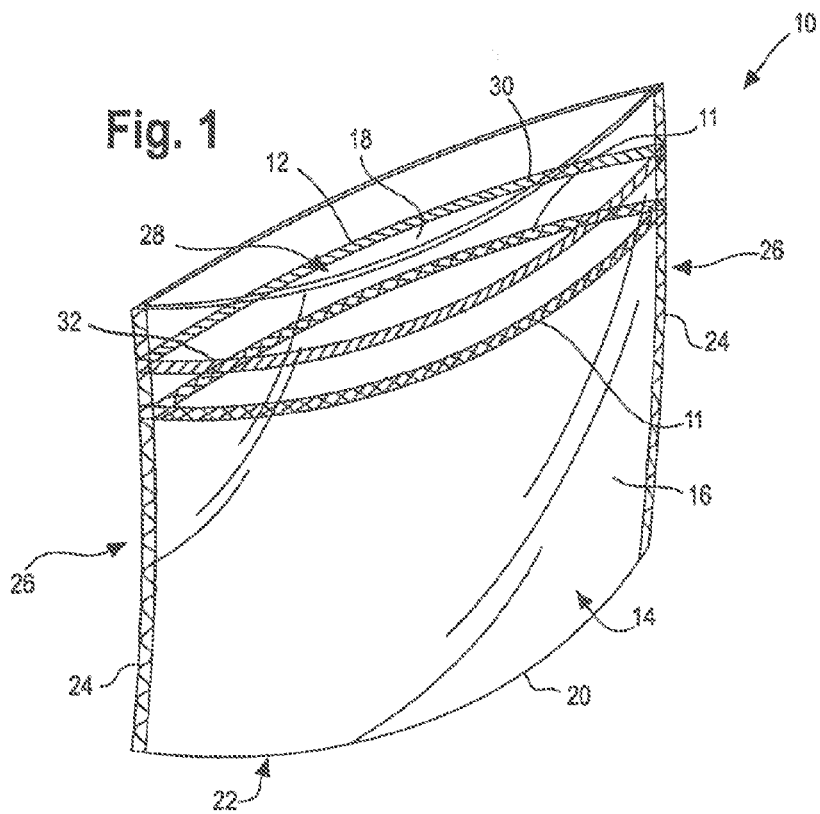
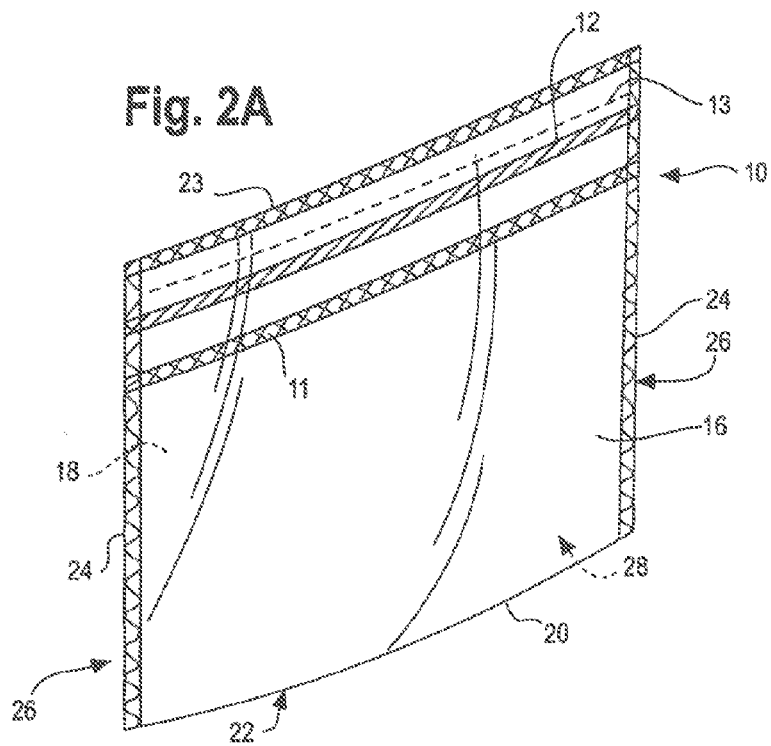

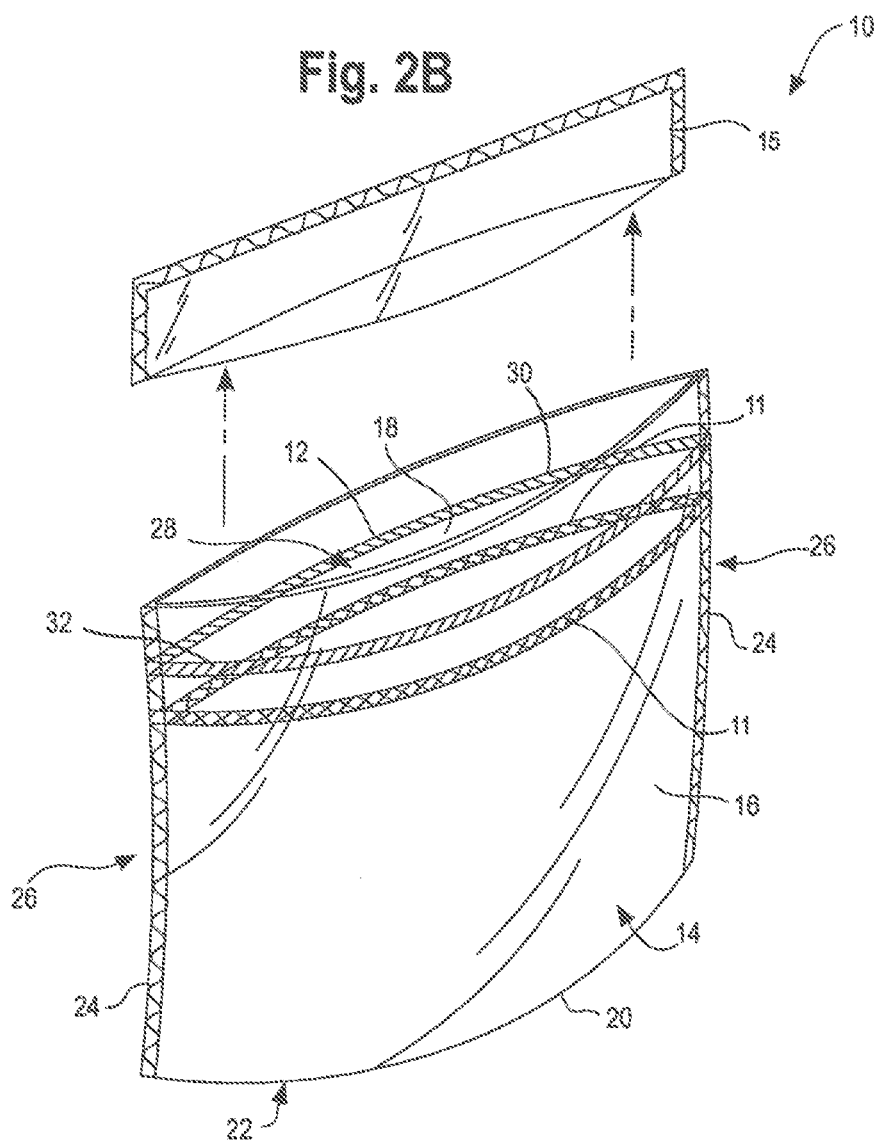

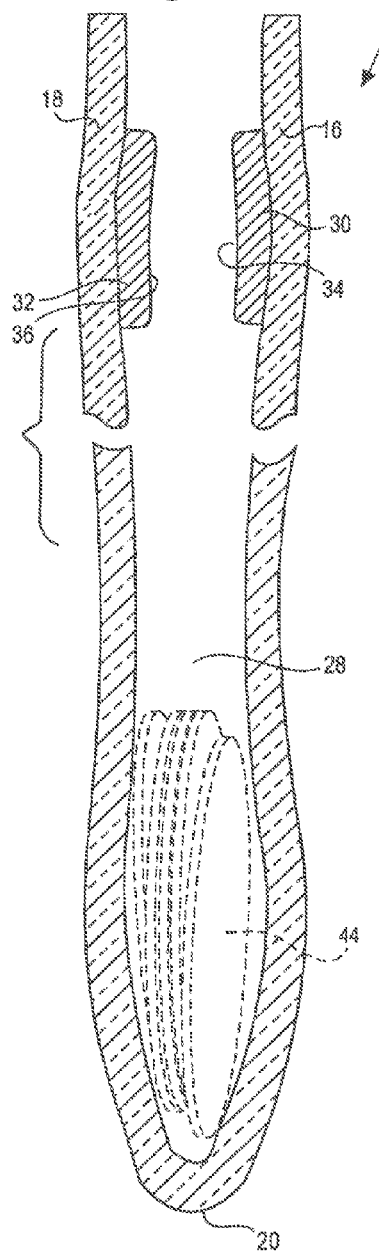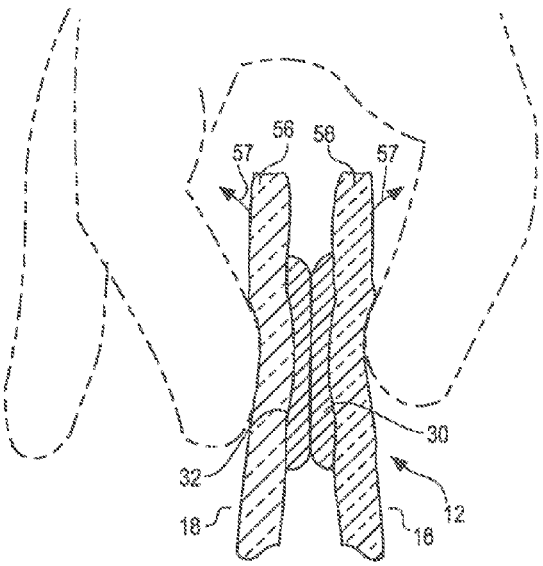

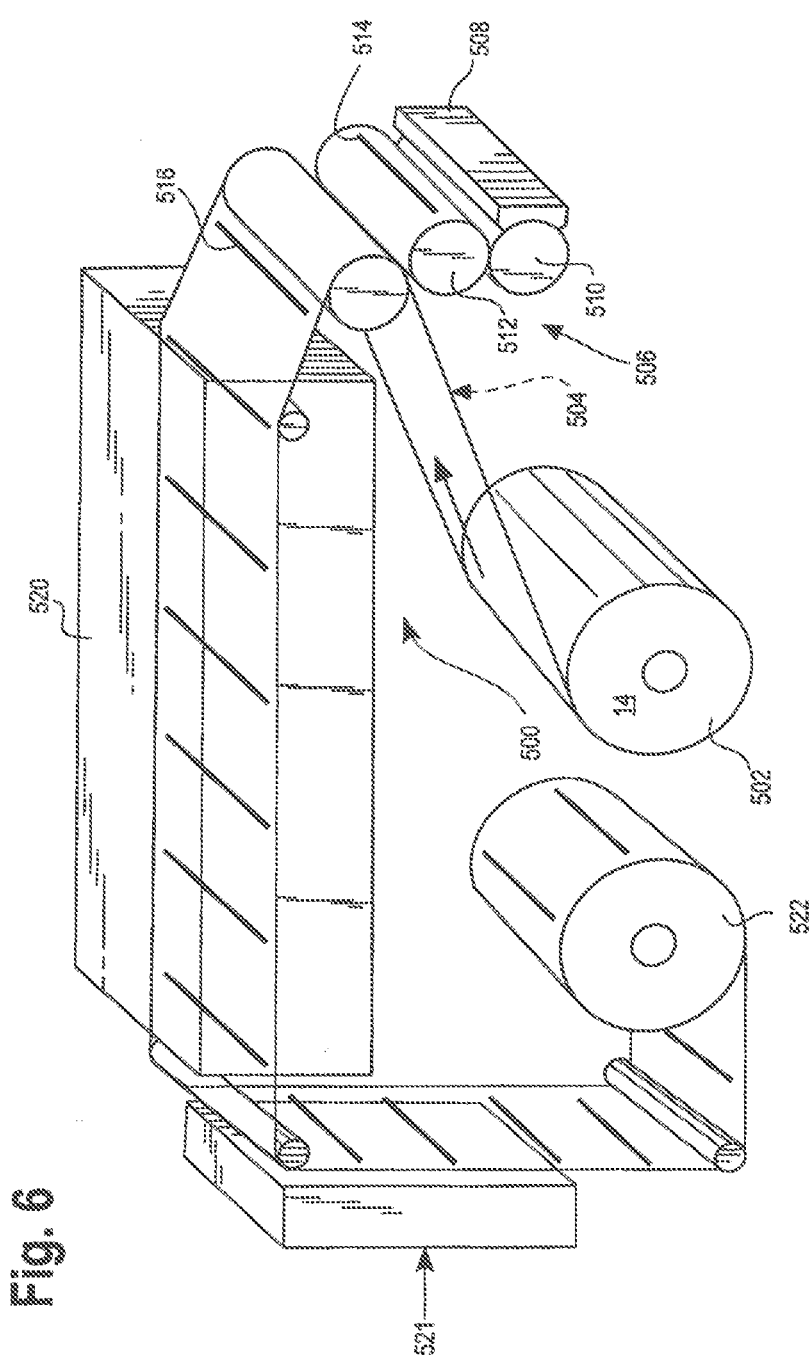

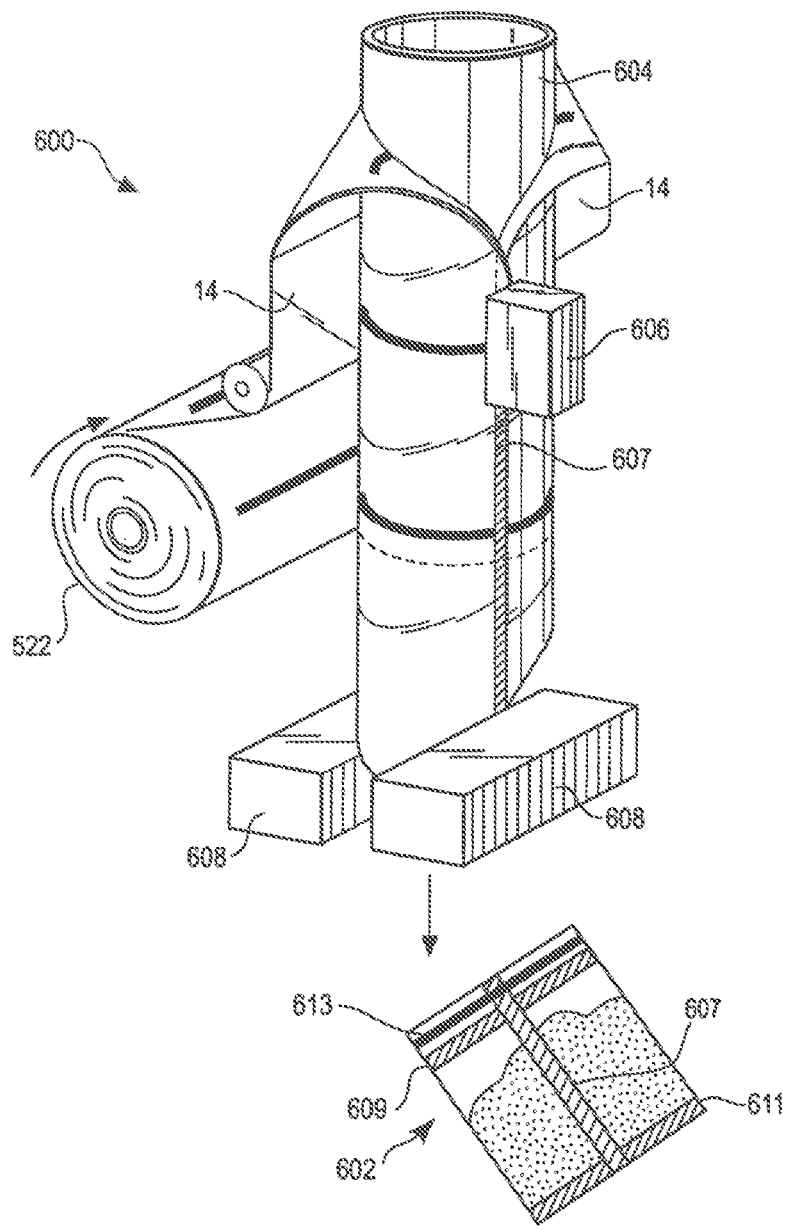

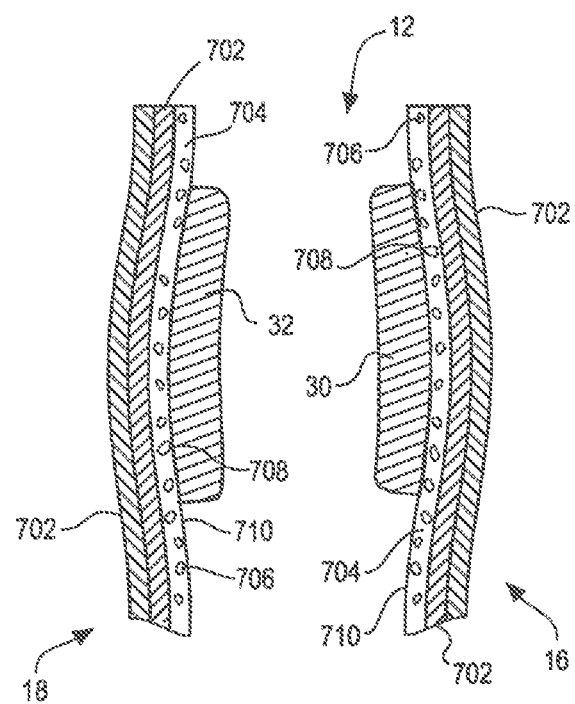

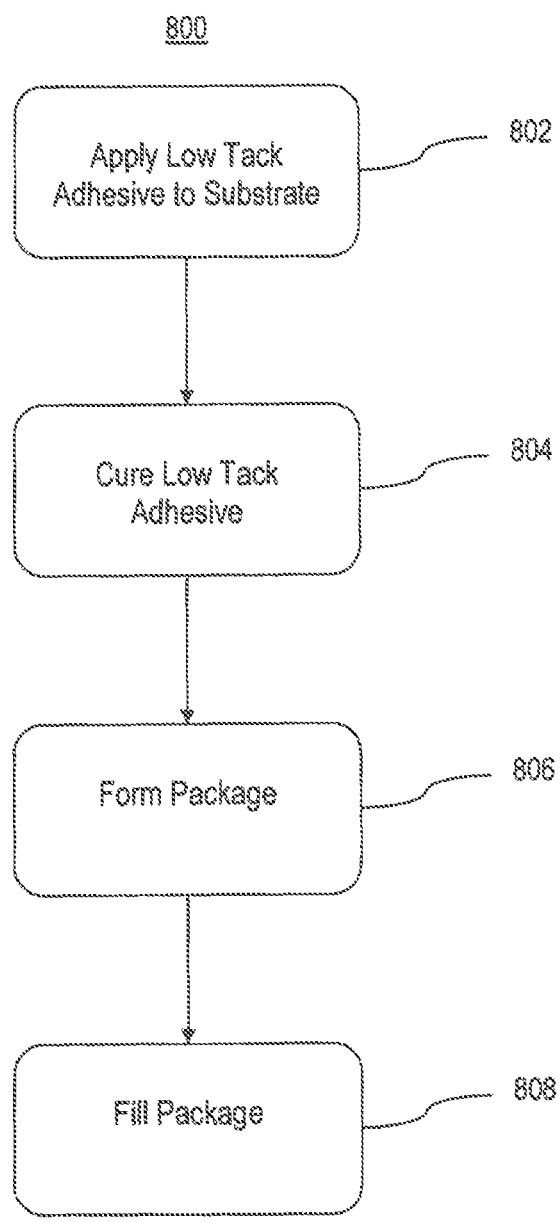

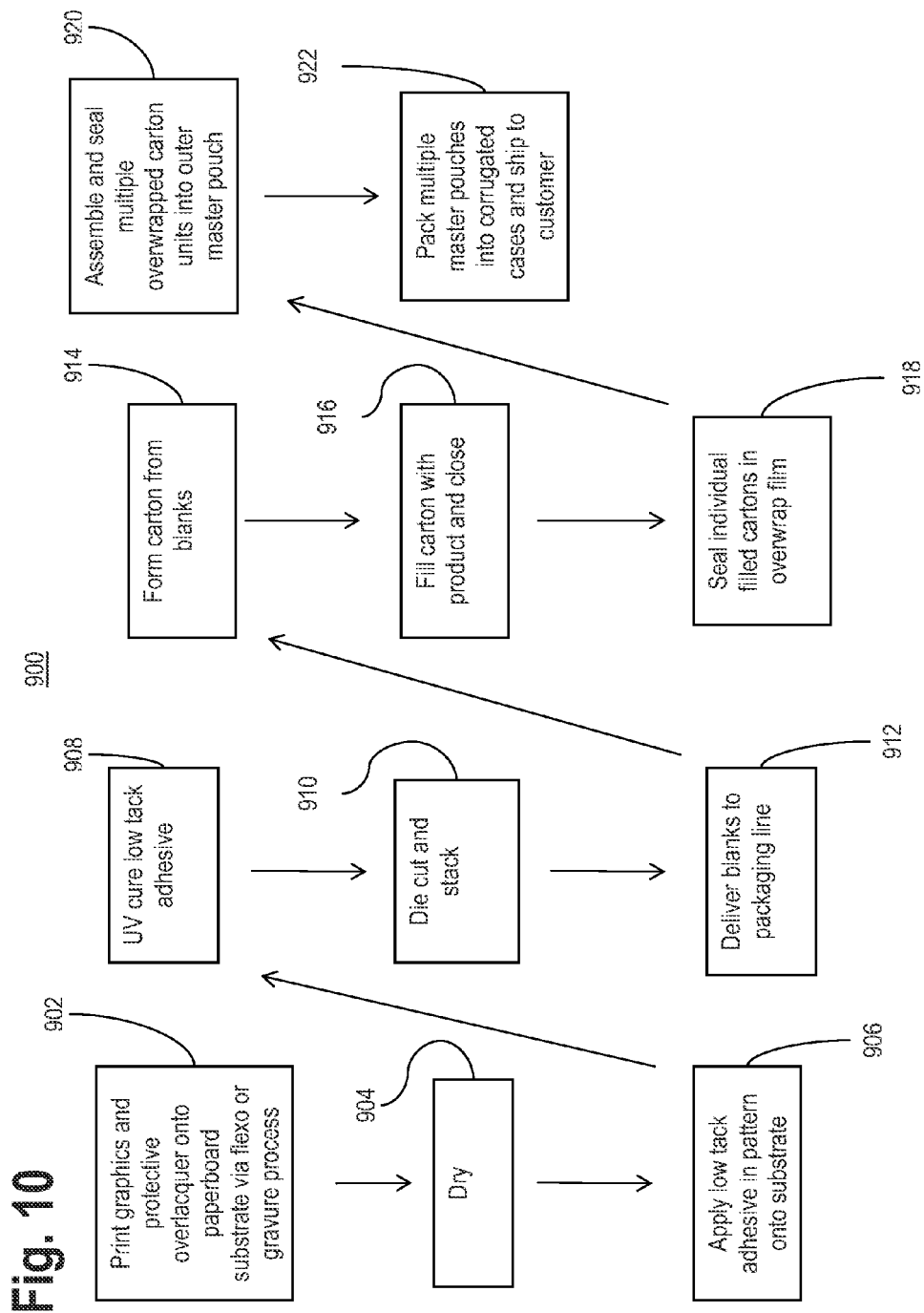

LOW-TACK, UV-CURED PRESSURE SENSITIVE ADHESIVE SUITABLE FOR RECLOSABLE PACKAGES

CROSS-REFERENCE TO RELATED APPLICATIONS

This application is a continuation of prior application Ser. No. 13/034,843, filed Feb. 25, 2011, now U.S. Pat. No. 8,389, 596 B2, which claims the benefit of U.S. Provisional Application Ser. No. 61/308,540 filed Feb. 26, 2010, U.S. Provisional Application Ser. No. 61/407,406 filed Oct. 27, 2010, and U.S. Provisional Application Ser. No. 61/407,409 filed Oct. 27, 2010, all of which are incorporated herein by reference in their entirety.

FIELD

This disclosure relates generally to low-tack adhesives and, in particular, to low-tack adhesives suitable for packages.

BACKGROUND

Several types of closures or fasteners are available for reclosing a previously opened package. For example, it is common to use mechanical reclosable fasteners, such as slider zippers, clips, tabs, interlocking strips, and the like. These mechanical closures can be bulky, complex structures that require separate molding and fabrication steps prior to being joined to the package. Further, film rolls and other packaging materials incorporating such fasteners can be unwieldy and difficult to handle due to the added bulk from the fasteners. Additionally, such fasteners can add significant material and production costs to a package. Mechanical fasteners may also not form an airtight seal upon closure. For instance, when in a closed position, slider zippers can have an undesirable small air channel or gap due to bridging of interlocking flanges between an end-stop and the slider. These mechanical fasteners can be applied in form, fill, and seal operations, but such a process can require complex manufacturing steps to apply, interconnect, and align the features of each structure. For these reasons, mechanical reclosable fasteners can add undue complexity cost, and expense into the manufacture of such packages.

Adhesive-based reclosable fasteners provide one alternative to the mechanical fasteners discussed above. Adhesive-based fasteners, however, present other challenges in both the manufacture and formation thereof. For example, thermoplastic elastomers (TPE) which are sometimes called thermoplastic rubber, have been used to form reclosable pressure sensitive adhesive (PSA) type fasteners. Some types of TPF copolymers (especially certain styrenic block polymers) demonstrate high cohesive properties, and at the same time have low tack levels or a reduced tendency to adhere to unlike materials. TPEs can be effective at forming reclosable fasteners; however, such TPEs tend to have undesirably high cohesive properties that render them difficult for use as a reclosable fastener in packaging applications because the TPE can delaminate from the package substrate rather than peel at the cohesive interface. Additionally, the TPEs may need to be dissolved in a solvent so that the TPE can be printed in a transverse or machine web direction as an intermittent pattern onto the package substrate. In some cases, organic solvents suitable for use as a carrier with TPEs may not be acceptable for contact with food items. Pattern application of TPEs in the form of an aqueous dispersion has been contemplated; however, creating TPE dispersions in water that are suitable for flexographic or rotogravure printing processes is technically difficult to accomplish. Even if a technically feasible method for dispersing TPE in water were to be discovered, the high cost of removing the water carrier after the coating is applied may render pattern coating of aqueous TPE dispersions commercially infeasible for high volume consumer packaging applications.

Other types of pressure-sensitive adhesives (PSAs) may be useful as reclosable fasteners for packages; however, common PSA reclosable fasteners generally have high tack levels. Tack is a property of an adhesive material that generally enables the material to form a bond with the surface of another material upon brief or light pressure. Tack is often considered as a quick stick, an initial adhesion, or a quick grab characteristic of a material. Ordinary PSA adhesives generally cannot be surface-printed onto materials that are intended to be run on commercial package forming equipment. Typical problems encountered when attempting to run PSA surface coated materials on packaging equipment include: blocking where the material does not unwind freely from a roll due to unacceptable back-side adhesion; picking where there is undesirable and unintended transfer of adhesive material to equipment surfaces, such as rollers, mandrels and filling tubes; poor tracking, such as the inability of the material to stay in proper alignment as it passes through the packaging machine; and jamming where the material is unable to slide over equipment surfaces and binds up.

PSA reclosable fasteners may also present concerns to a consumer using a formed package. If the package is used to contain a crumbly (i.e., a cookie, cracker, and the like) or shredded product (i.e., shredded cheese and the like), the high tack of most PSAs may cause the crumbs or shreds to stick to the PSA, which reduces the effectiveness of the adhesive to form a sufficient closure clue to contamination of the PSA surface from the food product. A PSA fastener that is sufficiently contaminated with product will generally not form an adequate closure seal because the crumbs that adhered to the PSA generally do not allow the PSA to adhere to the other side of the package.

Lower tack PSAs that function like cohesive materials generate other concerns. Lower tack adhesive can be difficult to adhere to a package surface due to the low tack properties. Thus, fasteners created with lower tack PSAs may result in delamination of the PSA from the package surface upon opening of the package.

SUMMARY

A low-tack, UV-cured pressure sensitive adhesive is provided having at least one UV-curable acrylic oligomer at least one tack control component, and optionally at least one elastomeric material. In one aspect, the adhesive has an adhesive component ratio (ACR) of the UV-cured pressure sensitive adhesive defined by formula (A) where the weight percent of the UV-curable acrylic oligomer relative to the sum of the weight percents of the tack control component and the optional at least one elastomeric material is about 0.5 to about 1.5

$$\frac{(\text{wt \% } UV\text{-curable acrylic oligomer})}{(\text{wt \% tack control component} + \text{wt \% elastomeric material})} \quad (A)$$

The ACR is effective so that the reclosable UV-cured pressure sensitive adhesive has a first peel adhesion between opposing adhesive portions of about 200 grams per linear inch (gpli) to about 900 gpli and up to five subsequent peel adhesions between opposing adhesive portions each about 30 percent to about 200 percent of the first peel adhesion and a first subsequent peel adhesion after forming with debris at least about 50 percent of the first peel adhesion. In another aspect, a liquid mixture of the LTV-curable acrylic oligomer, the tack control component, and the optional elastomeric material is compatible such that the liquid mixture remains a stable liquid that is homogeneous without phase separation for at least about 3 days at about 70 to about 75° F.

BRIEF DESCRIPTION OF THE DRAWINGS

FIG. 1 is a perspective view of an exemplary flexible package having an adhesive-based reclosable fastener thereon illustrated in an open condition;

FIG. 2A is a perspective view of a second embodiment of an exemplary package having an adhesive-based reclosable fastener thereon illustrated in a closed condition;

FIG. 2B is a perspective view of the package in FIG. 2A, shown in an open condition;

FIG. 5A is a cross-sectional view of the adhesive-based reclosable fastener illustrated in an open condition and with a filled package;

FIG. 5B is a partial cross-sectional view of the adhesive-based reclosable fastener of FIG. 3A illustrated in a closed condition;

FIG. 6 is an exemplary process to apply the adhesive-based reclosable fastener to a package substrate;

FIG. 7 is an exemplary process to form a package using a adhesive-based reclosable fastener;

FIG. 8 is a cross-sectional view of another exemplary adhesive-based reclosable fastener; and FIGS. 9 and 10 are exemplary processes to prepare packages with the adhesive-based reclosable fastener.

DETAILED DESCRIPTION

Figure 3A:
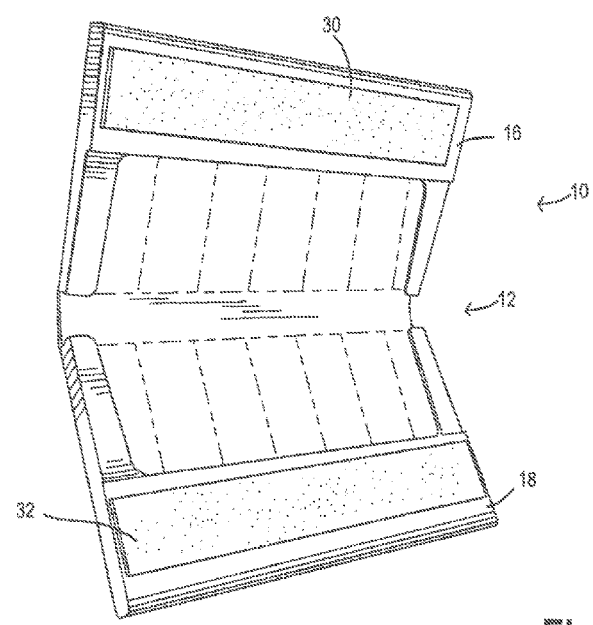
FIG. 3A is a perspective view of a third embodiment of an exemplary rigid package having an adhesive-based reclosable fastener thereon.

A low tack, adhesive-based reclosable fastener and packages utilizing the fastener are described herein. The fastener includes opposing layers, portions or patterns of low-tack adhesive that releasably adhere together to close the package. The fastener secures to a package substrate with a sufficient bond strength such that the opposing layers of adhesive do not delaminate from the package substrate when opened even when the adhesive has low tack. The adhesive used to form the fastener also has a relatively high cohesive bond strength, but at the same time a relatively low tack so that it can function as an effective reclosable fastener even when exposed with crumbs, lint, particulate, or the like. The opposing layers of adhesive can be applied on a variety of substrates such as packaging materials including, for example, film, paperboard or other paper products, cardboard, foil, metal, laminates, flexible, rigid, or semi-rigid plastic products, or combinations thereof. Similarly, these materials can be used to create a variety of packages or containers, including, for example, flexible pouches or bags, cartons or boxes, sleeves, and clamshell packages, to name a few.

In one aspect, an adhesive-based reclosable fastener and/or package substrate are generally constructed or have a composition effective to minimize the adhesion of the fastener to undesired surfaces and still function at the same time as an effective reclosable fastener that does not delaminate. That is, the adhesive-based fastener and/or package substrate has a unique formulation or construction to achieve select tack and peel values so that the adhesive-based fastener can be opened and closed multiple times to seal the contents in the package during use by a consumer, but at the same time, not delaminate from the opposing package substrate panels. To this end, the reclosable fastener generally includes a UV-cured adhesive with relatively low tack levels to minimize adhesion to the unwanted surfaces, a selected bonding or opening peel strength sufficient to enable secure reclosure of the package, and a peel strength robust enough to enable repeated opening and reclosing of the package. At the same time, the fastener also has a strong bond to the package substrate so that the adhesive does not delaminate upon opening of the fastener to access the package. By one approach, the reclosable adhesive-based fastener may include specific blends of a UV-curable acrylic oligomer and a tack control agent. In other approaches, the reclosable adhesive-based fastener may include specific blends of at least one UV-curable acrylic oligomer, at least one tack control agent, and at least one elastomer (rubber) component.

In one approach, the UV-cured, adhesive-based reclosable fastener is a UV-cured pressure sensitive adhesive (PSA) exhibiting cohesive properties and low tack, but, despite the low tack, still forms a strong bond to the package substrate forming the opposing package panels. As generally understood, a cohesive-based material typically adheres more readily to like materials (i.e., self-adhesion) rather than to non-like materials. Suitable adhesive materials used herein generally exhibit a relatively low tack to undesired surfaces, but at the same time still exhibit a good bond strength to desired surfaces (such as no delaminating from the opposing panels), and relatively good cohesive or self adhesion bond strength to like surfaces to hold a package or pouch closed, but still permit the package to be openable or peelable by hand. The selected adhesive-based materials also permit debonding or peeling from such like materials so that the adhesive layers may be repeatedly peeled apart without substantial damage to the adhesive material and/or any underlying package substrate. When the adhesive material is debonded or peeled apart, the selected adhesive materials have sufficient internal integrity and generally peel apart at an adhesive bonding interface substantially cleanly without substantial material picking, stringiness, delamination from the package substrate, and/or other substantial disfigurations of the material (i.e., globbing, etc.). Advantageously, the adhesive-based fasteners described herein maintain a peel adhesion where opposing adhesive strips contact each other with an average initial peel adhesion greater than about 200 grams per linear inch (gpli) and, in some cases, between about 200 gpli and about 900 gpli. Moreover, in some instances, the adhesive-based fasteners retain greater than about 200 gpli and/or at least about 30% to about 200% of the average initial peel adhesion after five repeated seal and unseal operations.

In another aspect, a package having the adhesive-based fastener disposed thereon is also constructed so that the bond or peel strength of the UV-cured, adhesive-based reclosable fastener to the package substrate is generally greater than the opening peel strength between the layers of the fastener itself.

In this manner, the reclosable fastener generally remains adhered to the package substrate and does not pick, string, or delaminate from the package substrate when the package is opened by a consumer and the fastener is peeled open. For example and in one approach, a primary bond or peel strength of the adhesive to the package substrate is greater than about 600 gpli (in some cases, greater than about 900 gpli) and is capable of withstanding multiple peel and re-seal cycles without detachment from the film substrate. In addition, the adhesive is cured so that it is capable of withstanding more than 100 double rubs with methyl ethyl ketone (MEK) solvent.

Turning now to the figures, an exemplary package 10 having a UV-cured, adhesive-based reclosable fastener 12 is generally illustrated in FIGS. 1 to 3. The package may include both flexible packages, such as a pouches, bags, sachets, and the like as well as more rigid packages, such as a boxes, cartons, envelopes and the like. In general, the package includes a plurality of walls that form a cavity therein configured to receive one or more products, such as food products. By some approaches, the package further includes opposing panels of packaging substrate configured to join together to restrict or block access, to contain items, and/or to preserve freshness. The adhesive-based fastener, as described above including the opposing adhesive portions, can be disposed on the opposing panels to provide a reclosable package. So configured, a user can separate the opposing panels and the opposing adhesive portions disposed thereon to access the one or more products in the cavity. Then, the user can join the opposing panels together, such as by shifting the panels toward each other or pivoting one or both of the panels with respect to the other, and applying slight pressure to adhere the opposing adhesive portions together, which recloses the package. These open and reclose operations can be repeated several time with minimal to no loss of bond strength of the fastener.

Figure 3B:
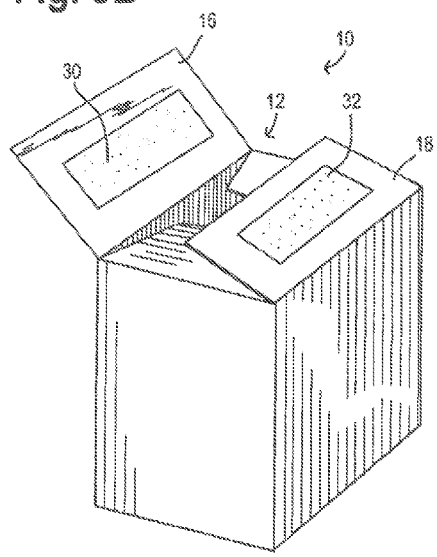
FIG. 3B is a perspective view of a fourth embodiment of an exemplary package with a pivotable cover, the package having an adhesive-based reclosable fastener thereon.
Figure 3C:
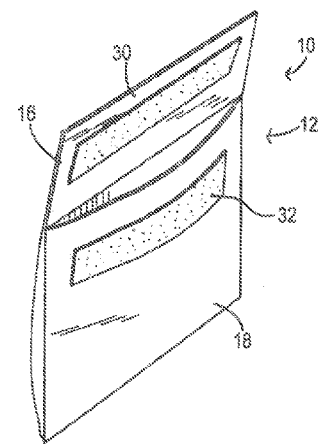
FIG. 3C is a perspective view of a fifth embodiment of an exemplary rigid package having an adhesive-based reclosable fastener thereon.

FIGS. 1 and 2 generally illustrate a flexible package utilizing the adhesive-based fastener 12. FIG. 1 shows the package 10 in an open condition, while FIG. 2A generally illustrates the package 10 in a closed or sealed condition. FIG. 3A generally illustrates the package 10 in the form of a more rigid hinged-type box suitable for containing one or more items, such as gum pieces. FIG. 3B is a box or carton having the adhesive-based fastener 12, and FIG. 3C shows an envelope or paper-based pouch utilizing the adhesive-based fastener 12. It will be appreciated that FIGS. 1-3 show examples of packages and other types, sizes, and configurations of the package may also be used as needed for a particular situation.

In general, the packages 10 of FIGS. 1-3 are formed from one or more portions, panels or pieces of material or substrate 14 formed into opposed front and back panels, walls, and the like (shown as panels 16 and 18 in the figures). The opposing walls also have opposing portions or patterns of adhesive 30 and 32 disposed thereon. As discussed above, however, the package can take a variety of forms having a variety of configurations or openings therein suitable for closure by the reclosable fastener 12, and specifically the opposing portions or patterns of adhesive 30 and 32.

In this exemplary form of FIGS. 1 and 2, the package 10 may also include a dead fold 20 along a bottom edge 22 thereof and transverse or side seals 24 along side edges 26 thereof so that the package 10 forms a cavity 28 between the front panel 16 and the back panel 18 for containing an item, such as a food item comestible, or other material. The package 10 may further include a top seal 23 (FIG. 2A) above the adhesive-based reclosable fastener 12, when the package 10 is oriented in an upright position. It will be appreciated that the form of package 10 is only an example of but one type of a package suitable for use with the adhesive-based reclosable fastener 12. As set forth above, other shapes, configurations, materials, and container/package types may also be combined with the adhesive-based reclosable fastener 12. The package 10 may further include other folds, seals, gussets, and/or flaps as generally needed for a particular application. The package 10 may also include a bottom seal at the bottom edge 22 instead of a fold 20. Optionally, the package 10 may also include non-reclosable peel seals 11 (shown, for example, in FIGS. 1 and 2A) either above or below the reclosable fastener 12 as generally provided in U.S. application Ser. No. 11/267,174, which is hereby incorporated herein by reference in its entirety. Additionally, the package 10 may also optionally include a rupturable line of weakness 13 (FIG. 2A) between the reclosable fastener 12 and an upper end of the package 10, which, upon complete rupturing, is adapted to remove a portion of the upper end of the package 10 by providing a removable shroud 15 above the reclosable fastener 12 to provide a package opening, as shown in FIG. 2B.

Figure 4:
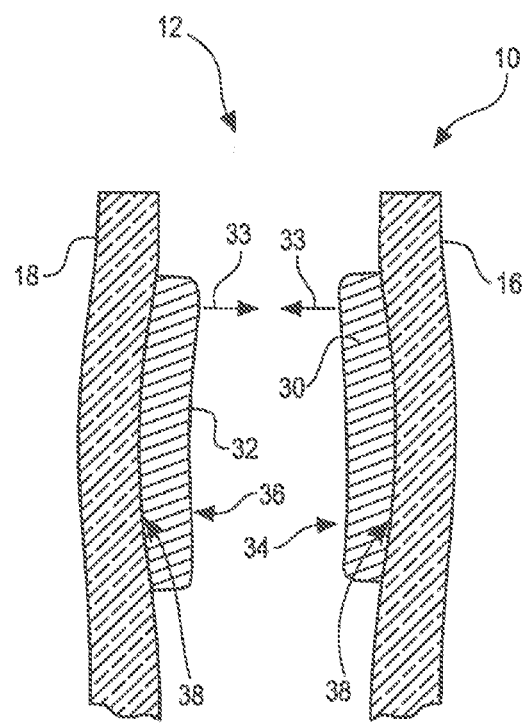
FIG. 4 is a cross-sectional view of an exemplary adhesive-based reclosable fastener.

Referring now to FIG. 4, one form of the adhesive-based reclosable fastener 12 is illustrated that includes the opposing adhesive layers or adhesive portions 30 and 32 with one of the layers 30 disposed on the front panel 16 and the other layer 32 disposed on the back panel 18. The fastener layers 30 and 32 are generally aligned with each other such that facing outer surfaces 34 and 36 of each fastener layer 30 and 32, respectively, oppose each other and are positioned to substantially contact each other in the closed or sealed condition as the layers 30 and 32 are engaged together. The adhesive layers 30 and 32 are preferably positioned at interior or inner surfaces of the front panel 16 and the back panel 18, as shown in FIGS. 4, 5A, and 5B. Alternatively, with other package forms, the adhesive layers 30 and 32 can be disposed on opposing portions of a hinged container (FIG. 3A), on overlapping flaps (FIG. 3B), on a package body and a cover flap (FIG. 3C), or other package surfaces as desired. As shown, the shape, pattern, and configuration of the layers 30 and 32 may vary as desired or required by a particular application. The adhesive portions 30 and 32 may also be provided in intermittent shapes, patterns, lines that may be regularly or irregularly spaced across the package panels.

Preferably, the opposing adhesive layers 30 and 32 can each be supplied in the form of a liquid coating mixture that may be heated and applied to the package substrate at a warm temperature, such as at about 160° F. (71° C.), but can be in the range of about 86° F. (30° C.) to about 190° F. (88° C.). After application of coating, the applied coating mixture, which can contain an added photoinitiator can be exposed to UV treatment to cure (polymerize) the coating and to form the solid adhesive-based fastener 12 on the package substrate. In one aspect, the applied coating can have a thickness of about 0.0005 inches, but can be in the range of about 0.0001 inches to about 0.005 inches; however, depending on package design, configuration, and requirements, a much thicker coating can be applied. By one approach, the coating mixture does not contain any or any substantial solvent that needs to be removed and may be easily applied to the package substrate on high speed coating and printing lines.

The first component of the adhesive is one or more UV-curable acrylate or acrylic oligomers. For instance, the UV-curable acrylic oligomer may be an acrylic or methacrylic acid ester having multiple reactive or functional groups (i.e., acrylic or methacrylic oligomers). In general, a functional group includes one UV reactive site. By one approach, UV reactive sites are most commonly carbon-carbon double bonds conjugated to another unsaturated site such as an ester carbonyl group. By one approach, the UV-curable acrylic oligomer is an acrylic or methacrylic acid ester of a multifunctional alcohol, which means the oligomer has more than one acrylated or methacrylated hydroxyl group on a hydrocarbon backbone of the oligomer. By one approach, the adhesive may include about 1% to about 90% by weight of the UV-curable acrylic oligomers and with functionalities of about 1.2 to about 6.0. In another approach, the UV-curable acrylic oligomers may have a functionality of about 2.0 to about 3.0. In other approaches, the adhesive may include about 20% to about 70% by weight (in some cases, about 33% to 60% by weight) of the acrylic oligomers.

In one form, the multifunctional UV-curable acrylic acid ester is an acrylic acid ester of a vegetable oil having a reactive functionality of 2.0 or greater. In another aspect, the UV-curable acrylic oligomer can comprise an epoxidized soybean oil acrylate. In general, the amount of the UV-curable acrylic oligomers used, based on a preferred adhesive component ratio (ACR) (to be discussed herein), can impact the properties of the final adhesive. For instance, where the amount of the UV-curable acrylic oligomer is too low, based on the preferred ACR, the cure rate of the final adhesive is too slow. On the other hand, where the amount of the UV-curable acrylic oligomer too high, based on the preferred ACR, the final adhesive may be adequately cured, but can have inadequate self adhesion properties to seal and reseal.

The second component of the adhesive is a tack control agent. By one approach, the adhesive may include about 1% to about 65% by weight of the tack control agent. In another approach, the tack control agent can be present in amounts from about 20% to about 65%. The tack control agent can include a tackifying resin or a curable polymer/monomer combination that when cured can produce the desired levels of tack and self-adhering properties appropriate for the reclosable fastener 12. In one aspect, the tack control agent can comprise an aliphatic urethane acrylated oligomer. Many other types of tack control agents suitable for UV-curable PSA adhesives may also be used in the reclosable adhesive system.

An optional third component of the adhesive is at least one elastomeric or rubber component. By one approach, the elastomeric component may include at least one curable acrylated (i.e. acrylic modified) or methacrylated esters of a hydroxy-terminated elastomeric polymer (i.e., sirs elastomeric polyol). This elastomeric component can include acrylic-modified polybutadiene, a saturated polybutadiene and/or a flexible polyurethane. In one aspect, a methacrylated polybutadiene can be provided. The elastomeric material can be provided in amounts of about 0% to about 20% when used in the adhesive. In one aspect, the elastomeric material is provided in amounts of about 5% to about 15%. Satisfactory adhesives can be made with the desired low tack, resealable properties as described herein without the elastomer component; however, it is believed that the elastomeric component aids in achieving an optimal coating performance. The optimal adhesive performance can be defined by properties such as self-adhesion, tack, viscosity, and cure rate, just to name a few. The elastomeric component is useful for adjusting peel strength properties, substrate adhesion strength, increasing flexibility, viscosity control, and cure rate modulation.

To achieve the balanced peel, tack, and bond to the package substrate as described herein, it was determined that the amounts of the three adhesive components need to fail within a specific adhesive component ratio (i.e., ACR) of the acrylate oligomer relative to the elastomeric and tack components. Preferably, the ACR for the adhesive is:

$$\frac{(\text{wt \% of acrylate oligomer})}{(\text{wt \% of elastomeric material} + \text{wt \% of tack control agent})} = 0.5 \text{ to } 1.5.$$

In a preferred approach, the ACR can be in the range of about 0.8 to about 1.5.

The range for the ACR of the three components in the formulation has been found to provide a unique adhesive formulation with a low tack property to non-like substances (i.e., machine components, crumbs, food pieces, and the like), yet can seal to itself with sufficient bond or peel strength to maintain a seal therebetween as well as resist contamination. The adhesive in this specific ACR also provides for a resealable function that does not significantly reduce or lose its seal-peel-reseal qualities upon being subjected to repeated open and close operations. An ACR value below about 0.5 is generally undesired because the adhesive would require significantly large amounts of UV energy to cure. If the ACR is above about 1.5, the adhesive would cure quickly, but it would also have low (or no) peel strength, unacceptable for the adhesive closure herein. In addition to the desired range of the ACR, a satisfactory adhesive formulation in some cases may also have certain other parameters such as mixture-stability of the components, a certain viscosity of the formulation, a certain cure rate, and/or a certain peel strength.

Not only is the ACR of the adhesive components desired, but the adhesive components must also be compatible with each other such that they form a stable flowable liquid mixture. As used herein, the adhesive is considered stable when it (at a minimum the two or three main components remains a homogeneous liquid, i.e., there is no visible phase separation of the components and no gel formation, while being held at room temperature (about 70° F.-75° F.) for up to three days.

In addition, the adhesive formulation can have a viscosity in the range of about 10,000 to about 50,000 centipoise (cPs) or less when at room temperature, or about 2,000 cPs or less at about 160° F. (71° C.) and, in some cases, about 200 cPs or less at about 160° F. (71° C.). This viscosity range provides for applying the adhesive to a film substrate using conventional printing, roll coating, slot-die application techniques or other suitable application methods as needed for a particular application.

To produce a sufficiently cured adhesive layer on the film substrate, the adhesive can be cured using UV light sources capable of delivering energy in the range of about 100 mJ/cm$^2$ to about 800 mJ/cm$^2$. This in turn helps to ensure that the adhesive has sufficiently cured as determined by an MEK rub resistance test value (ASTM D5402-06) of about 100 double rubs or more (to be discussed in further detail herein).

The average initial peel strength of a properly cured adhesive can be in the range of about 200 gpli to about 900 gpli and, in some cases, about 280 gpli to about 800 gpli, and in other cases, about 280 gpli to about 650 gpli, as measured by ASTM D3330/D3330M-04 method F. The adhesive is also designed to retain its average peel after repeated open and close operations (i.e., adhesion retention). Preferably, the cured adhesive can retain its average initial peel adhesion between about 280 gpli and about 800 gpli up to at least five repeated peel-reseal cycles. This is called the adhesive retention valve. Preferably, the adhesion retention value upon peeling-resealing-peeling can be between about 30% to about 200% retention of the initial value. Upon contaminating the adhesive with crackers, the adhesion retention value can be between about 30% to about 150% of the initial value, where the cracker contamination test method is as described herein.

By some approaches, a UV photoinitiator can also be added to the adhesive to aid in initiating the curing process. The photoinitiator can be present in amounts of about 0.1% to about 5%. In one aspect, a photoinitiator can comprise a blend of benzophenone derivatives and a synergist compound. A synergist compound is a compound that interacts with the excited benzophenone molecules to form free radicals by electron transfer and hydrogen abstraction. One example is a mixture comprising trimethylbenzoyldiphenylphosphine oxide, α-hydroxyketones and benzophenone derivatives, where the synergist compound includes the first two compounds listed. In another example, the photoinitiator is n-hydroxyketone by itself. In another aspect, a photoinitiator can comprise onium salts or other acidic materials activated by UV light. The binder can be comprised of cationically reactive materials such as epoxides, vinyl esters and the like. Optionally, these can also be cross-linked with resins functionalized with carboxylic acid, hydroxyl, or other nucleophilic groups.

In one form, the package substrate 14 can be flexible sheet material or film, which may be formed of various plastic polymers, co-polymers, papers, foils or combinations thereof. The film substrate may be a multi-layer coextrusion and/or a laminate with constructions to enhance interfacial bonding with the UV-cured adhesive fastener 12. In general, the polymeric layers may include polyolefins such as polyethylene (high, medium, low, linear low, and/or ultra low density polymers including metallocene or polypropylene (oriented and/or biaxially oriented)); polybutylene, ethylene vinyl acetate (EVA); polyamides such as nylon; polyethylene terephthalate; polyvinyl chloride; ethylene vinyl alcohol (EVOH); polyvinylidene chloride (PVDC); polyvinyl alcohol (PVOH); polystyrene; or combinations thereof, in monolayer or multi-layer combinations. In one aspect, the film substrate includes EVA. By one approach, the film substrate can have a film thickness between about 0.5 mils to about 5 mils thick. Examples of suitable film substrate may be found in U.S. Publication Nos 2008/0131636 and 2008/0118688, which are both incorporated herein in their entirety.

By one approach, the package substrate 14 may be a single layer or a multi-layer film. An exemplary multi-layer film may include an inner heat sealable (sealant) layer to which the adhesive fastener 12 is bonded and one or more structural and/or functional layers. In one particular example, the package substrate 14 may include the inner sealant layer and an outer structural layer including one or more layers of high density polyethylene and/or one or more layers of nylon. The inner sealant layer may include various polymers and/or blends of polymers. By one approach, the package substrate 14 and/or the inner sealant layer may include blends of ethylene vinyl acetate (EVA), polyethylene (such as linear low density polyethylene-LLDPE), and one or more optional adhesion promoting filler particles dispersed throughout to be described in more detail below. For example, the inner sealant layer may include about 60% to about 80% EVA, about 5% to about 20% polyethylene, and about 3% to about 15% of the adhesion promoting filler particles or a filler composition including the particles. Such construction may form a polymeric dispersion in which the EVA may be a primary or continuous phase in which the polyethylene and filler/filler composition is a dispersed phase therein. With this approach, the adhesive-based fastener 12 is applied to the inner sealant layer, which forms the inner surface of the package 10. By another approach, the multi-layered film may include multiple layers such that about 85% of the total film thickness is high density polyethylene and about 15% of the film thickness is the sealant layer.

By another approach, the package substrate may be a paperboard or the like material having a coating or polymer layer thereon. The coating or polymer layer may include an ethylene vinyl acetate (EVA), polyethylene, and blends thereof. This coating or layer may include the fillers described above and may also include the fillers supplied in the maleic anhydride grafted linear low density polyethylene carrier (MA-LLDPE) as described below.

In one form, the package substrate 14 has a construction to enhance the primary bond or an interfacial bonding between the adhesive and the package substrate 14. To this end and by one approach, the package substrate may include the adhesion promoting filler particles blended with at least a portion of the package substrate 14, such as, the adhesion promoting filler particles blended into the inner sealant layer of a film as described above. By one approach, the adhesion promoting filler particles may be micro- or nano-sized fillers of clay, calcium carbonate, montmorillonite, microcrystalline silica, dolmite, talc, mica, oxides, (silicon oxides, aluminum oxides, titanium oxides, and the like) and other additives and/or combinations thereof, blended into at least the inner, sealant, or surface layer(s) of the package substrate to enhance the primary bonding of the adhesive fastener 12 to the package substrate 14. In particular, an organoclay is used, and in one aspect the organoclay is organically modified montmorillonite or, in some cases, an exfoliated organoclay. Organoclay is an organically modified natural clay such as a montmorillonite clay that is processed or treated with surfactants such as quaternary ammonium salts. Montmorillonite is a phyllosilicate group of minerals that typically comprises a hydrated sodium calcium aluminum magnesium silicate hydroxide. While not wishing to be limited by theory, the organoclay-filled substrate and, in particular, the organically modified fillers can have the ability to aid in producing operable and reclosable adhesive-based closures that do not delaminate from the package substrate 14 upon being peeled open.

In some approaches, useful adhesion promoting filler particles have a surface area greater than about 100 $m^2$/gram and an aspect ratio greater than about 10. In other approaches, the organoclay used in the sealing layer typically comprises a plurality of particles. In one variation, the organoclay comprises a plurality of particles having at least one spatial dimension less than about 200 nm. In another variation, the organoclay comprises a plurality of particles having at least one spatial dimension less than about 100 nm. In another variation, the organoclay comprises a plurality of particles having at least one spatial dimension less than about 50 nm. In still another variation, the organoclay comprises a plurality of particles having spatial dimensions greater than or equal to about 1 nm. In still another variation, the organoclay comprises a plurality of particles having spatial dimensions greater than or equal to about 5 nm. In another variation, the organoclay comprises platelets having an average separation between the platelets of at least about 20 angstroms. In yet another variation, the organoclay comprises platelets having an average separation of at least about 30 angstroms. In still another variation, the organoclay comprises platelets having an average separation of at least about 40 angstroms. Typically, before combining with the thermoplastic polymer, the organoclay comprises platelets having an average separation between from about 20 to about 45 angstroms. Advantageously, upon combining with the substrate or at least the sealant layer thereof, the organoclay becomes dispersed throughout such that the average separation is maintained or, in some cases, increased.

Effectively dispersing the clay or other adhesion promoting filler particles in polyethylene and EVA used for the sealant layer can be a challenge due to incompatibility of clay fillers and certain polymers. Thus, supplying the adhesion promoting filler particles using a filler composition including the filler blended with a compatible carrier helps aid in the mixing and dispersing of the filler into the sealant layer of one form of the package substrate 14. By one approach, the adhesion promoting filler particles can be supplied in a maleic anhydride grafted linear low density polyethylene carrier (MA-LLDPE). By another approach, the carrier may be a blend of MA-LLDPE and unmodified polyethylene. While not wishing to be limited by theory, the maleic anhydride portion of the carrier has an affinity for the filler particles, such as clay, and the polyethylene portion of the carrier mixes well with other polyethylene and ethylene-like polymer components of the sealant layer or package substrate 14. Exemplary clay filler compositions may be obtained from PolyOne Corporation (Avon Lake, Ohio). Without wishing to be bound by theory, it is believed that the organically modified clay particles, which may be highly polar, and/or the maleic anhydride grafted linear low density polyethylene (MA-LLDPE) carrier resin present with the clay fillers serve to promote adhesion of the cured adhesive coating to the substrate surface by increasing the surface energy of the substrate layer.

Additionally, it is also believed that on a microscopic level the clay or other adhesion promoting filler particles may impart an increased surface roughness to the substrate, positively affecting the coefficient of friction of the substrate and increasing the available contact surface area between the substrate and the adhesive, thereby providing more sites for chemical and/or mechanical bonding to occur. This will be discussed in more detail below with respect to FIG. 8. By one approach, approximately 0.5% to about 20% by weight of the filler composition in the sealant layer is expected to have a beneficial impact on the primary bond strength of the adhesive fastener 12 to the package substrate 14 so that the primary bond to the substrate is greater than the peel adhesion between the adhesive layers 30 and 32 such that the fastener 12 does not delaminate upon opening. Additionally, the filler or particles may roughen the surface of the substrate layer enabling it to slide freely over metal surfaces of packaging equipment without binding, thus enabling the reduction or elimination of a migratory slip additive in the film. In some approaches, the inner sealing layer having the filler has a higher degree of surface roughness, such as an average roughness of about 1500 angstroms to about 5000 angstroms. The sealing layer may also have a higher tensile modulus than layers without the filler. In some approaches, the inner sealant layer has a tensile modulus of about 500 to about 2000 mPa.

An optional component of the package substrate 14 can include a migratory slip additive, which helps to decrease coefficient of friction between the film and other surfaces, allowing the substrate to slide freely over metal surfaces or itself. In one aspect, an erucamide slip additive (i.e., an unsaturated fatty primary amide) can be provided. In prior films, high levels of slip additives have been used ranging from 2000 ppm to 7000 ppm; however, it has been discovered that at these high levels it is difficult for the adhesive 12 to bond to the low energy surface of the film because the slip additive blocks surface sites where adhesion can take place. However, the addition of the filler allows for a much lower level of the slip additive to be used, such as less than about 1000 ppm. In other cases, the film has less than about 700 ppm of the slip additive or in yet other cases no slip additive. Since the use of the filler reduces the coefficient of friction between the film and other surfaces, an effect that was previously achieved with addition of the migratory slip additive, this allows for the migratory slip additive concentration to be lowered or eliminated. A lower migratory slip additive level than typically used can also help to increase the bonding of the cured coating to the substrate both initially and over time because there is less of the additive to interfere with the bonding of the coating to the substrate. While not wishing to be limited by theory, it is believed that the fatty acid amides in slip additives, which are low molecular weight components, can migrate or bloom to the surface of the film affecting the strength of the bond between the film's surface and the adhesive fastener 12. While corona treating or flame treating may initially burn off any fatty acid amides on the surface of the film resulting in an initial good bond strength of the adhesive. Over time additional fatty acid amides can migrate or bloom to the film surface, which results in a reduced bond strength over an extended shelf life. Additionally, a high level of slip additive may also migrate or bloom to the surface of the adhesive portions, which may negatively impact the cohesive and bond strength therebetween.

Additionally, prior to applying the adhesive to the package substrate 14, the substrate can undergo a surface pretreatment to increase the surface energy, and/or application of a primer coat. For example, surface treatments may include corona treating, plasma treating, flame treating, and the like or chemical coatings, such as primers or adhesion promoters may also be used. A corona treatment can increase the surface energy of the substrate which improves the coating's ability to bond and remain bonded to the substrate. A corona pretreatment can include a cloud of ions that oxidize the surface and make the surface receptive to the coating. The corona pretreatment basically oxidizes reactive sites on the polymer substrates. If corona treating, ideally the surface energy after treatment should be about 36-40 dynes/cm or greater at the time of coating application.

Without wishing to be bound by theory, it is believed that the corona treatment of the substrate surface helps to provide for a strong bond between the coating layer and the substrate surface due to the increased surface energy of the substrate. In addition to the corona treatment, the combination of the corona treatment with a low concentration of a slip additive and the incorporation of a filler composition within the substrate film 14 together result in a strong bond between the reclosable fastener and the substrate.

Turning to the coating process, the liquid coating formulation can be heated to a certain temperature in the range of about 86° F. (30° C.) to about 190° F. (88'C) and preferably about 120° F. (49° C.) to about 160° F. (71° C.) such that the viscosity is low enough for pattern application by flexographic, rotogravure, or slot-die processes onto the package substrate 14. The package substrate 14, as discussed above, can contain a filler throughout (or at least through certain portions or layers) and less than about 1000 ppm of a slip additive in the polymer film substrate. After the liquid coating material is applied to the substrate it can be UV-cured to form a solid reclosable adhesive fastener. In one aspect, the UV radiation (about 10 nm to about 400 nm wavelength radiation) can be supplied at an energy level between about 100 mJ/cm$^2$ to about 800 mJ/cm$^2$, and in other cases about 400 mJ/cm$^2$ to about 730 mJ/cm$^2$.

As shown in the examples below, it has been discovered that UV-curing is preferred because in general other forms of curing (such as electron beam) do not provide for the desired bond and peel when using the ACR values described above. In one aspect of UV-curing, a photoinitiator comprising a blend of benzophenone derivatives and a synergist compound can be used in the coating formulation, which can result in the formation of free radicals. In free radical initiated polymerization systems, the curing reaction stops at the moment the UV energy source is withdrawn. An alternative mechanism for UV curing is cationic initiated polymerization. Cationic initiated polymerization systems, which use photoinitiators, such as onium salts or other UV activated acid catalysts to crosslink epoxides or vinyl esters, differ from free radical initiated systems in that the curing reaction continues even after the source of UV energy is withdrawn.

As mentioned above, the adhesive-based reclosable fastener 12 generally has a peel or bond strength to permit the opposing layers 30 and 32 to be bonded together in order to close or re-seal the package 10. For example, a consumer may press the two opposing layers into engagement to seal or close the package as illustrated by the arrows 33 in FIG. 4, and as shown pressed together in FIG. 5B. By one approach, the bond between adhesive layers 30 and 32 is generally sufficient to seal the layers 30 and 32 together and, in some cases, form a hermetic seal. As used herein, hermetic is understood to mean a generally air tight seal. In one example, the selected pressure sensitive adhesive (PSA) forming the layers 30 and 32 may exhibit an initial cohesive or peel bond strength of about 200 g/inch to about 900 g/inch (i.e., or grams per lineal inch, gpli), and in some cases, between about 200 g/inch to about 400 g/inch as measured by the ASTM peel test D3330/D3330M-04 method F; however, the reclosable fastener 12 may have other peel strength values dependent on the particular application or particular measurement test. In one aspect, the preferred peel strength ranges from about 280 gpli to about 800 gpli. Peel strengths greater than this level (i.e., greater than about 900 gpli) are generally too high when used with certain packages to be useful for a peelable and resealable package since the substrate may be damaged when the cohesive bonds are broken at these high strengths. The selected PSA may further have a subsequent peel bond strength (adhesive retention) preferably after five open/close operations of at least about 200 gpli, or in other cases at least about 30% to about 200% of the initial peel, and, at a minimum, about 50 g/inch to about 200 g/inch, where the subsequent peels comprise the seal-reseal action that occurs after the initial opening of the package 10 and separation of the reclosable fastener 12.

The adhesive-based fastener 12 also preferably has a relatively low tack level that enables the fastener to minimize and, preferably, limit the adhesion of the fastener 12 to unwanted materials (i.e., contamination) and surfaces, such as food particles, forming equipment surfaces, rollers, and the like. By one approach, the adhesive may have a tack level to undesired surfaces not exceeding about 5 psi when preloaded with about 4.5 pounds using the ASTM probe tack test D2979. By another approach, the PSA coating may have a tack level not exceeding about 15 psi when preloaded with about 10 pounds. However, the tack level may also vary depending on the particular PSA and application thereof and measurement test used. Using another metric, the adhesive-based fastener 12 exhibits a tack as measured by a modified version of a rolling ball test in ASTM D3121 where the adhesive tack permits about 1 inch to about 8 inches of ball travel. In some cases, up to about 14 inches of ball travel. The modified D3121 test is explained further below and in the examples.

Even with such relatively low tack levels to undesired surfaces, the adhesive layers 30 and 32 still form a sufficiently strong primary bond with the package substrate 14 forming the front and back panels 16 and 18 so that the adhesive layers 30 and 32 are not substantially delaminated therefrom when the package 10 is opened. By one approach, the primary bonding strength of the adhesive layers 30 and 32 to the package substrate 14 at an interface 38 thereof is generally greater than the peel strength of the cohesive material itself. For example, the primary peel strength of the selected cohesive material to the film substrate forming the front and back panels 16 and 18 is greater than the peel force between layers 30 and 32 and generally greater than about 600, in other cases greater than about 900 g/inch. In other cases, greater than about 1000 g/inch and, in yet other cases, greater than about 1200 g/inch. In other instances, the primary peel strength may range from about 600 to about 1200 g/inch (in some cases, about 600 to about 900 gpli). However, the peel strength may also vary depending on the package substrate 14, the PSA, and other factors.

In addition, it is further anticipated that interfacial, mechanical, or chemical bonding of the adhesive materials 30 and 32 to the substrate 14 may be enhanced through particular constructions of the substrate materials 14 to increase bonding surface energy as generally discussed above. As discussed above, the substrate 14 may be a single layer or a multi-layer film, and, in such a case, it is preferred that at least an innermost layer of the substrate film 14 forming the front and back panels 16 and 18 may be composed of a polymer blend containing ethylene vinyl acetate (EVA) and linear low density polyethylene (LLDPE). Where an additive or the adhesion promoting filler particles are also present, it is preferably present in and dispersed throughout at least this innermost layer (i.e., EVA/LLDPE blend innermost layer). Preferably the EVA is the predominant component of the blend, at about 65% to about 90%, and the LLDPE is a minor component of the blend, at about 5% to about 25%. Preferably, the substrate, innermost layer, and/or the blended EVA/ELOPE layer would have low concentrations of migratory slip additives (commonly added to packaging substrate in order to obtain a coefficient of friction suitable to process the substrate on form, fill, and seal machines). It is appreciated that such additives may include amounts of fatty acid amides, and it has been discovered that such compounds can affect the bond strength of cohesive materials to the substrate. By one approach, therefore, the package substrate 14 may have less than about 1000 ppm of fatty acid amides (i.e., migratory slip additives) throughout the innermost layer some cases, throughout the entire substrate 14.

While not wishing to be limited by theory as mentioned above, it is believed that fatty acid amides, which are low molecular weight components, can migrate or bloom to the surface of the substrate affecting the strength of the bond between the substrate's surface and the cohesive materials. While corona treating or flame treating may initially burn off any fatty acid amides on the surface of the substrate resulting in an initial good bond strength of the PSA, over time additional fatty acid amides can migrate or bloom to the substrate surface, which results in a reduced bond strength over an extended shelf life. As a result, it is desired to reduce the fatty acid amide content in the substrate (either the inner most layers or the entire substrate) to levels below about 1000 ppm, which provides for both good initial bond strength and good long term bond strength because there are such small amounts of these impurities to bloom to the substrate surface over time. Alternatively, such substrate formulation variations may also be combined with use of other surface treatments (corona treating, plasma treating, flame treating, and the like) or other coatings as needed for a particular application.

By one approach, suitable flexible films forming the front and back panels 16 and 18 may be a polyethylene based film about 0.5 mils to about 5 mils thick and, in some cases, about 3 mils thick. Turning to FIG. 8 for a moment, one approach of a flexible film forming the front and back panels 16 and 18 is shown as a multi-layer coextruded film including a structural base of one or more layers (two are shown) of a high density polyethylene 702 (HDPE) and an inner or adhesive receiving layer (such as the above described sealant layer) of an EVA/LLDPE heat seal layer 704 filled with the adhesion promoting filler particles 706. With this approach, the adhesive fastener 12 is applied to the inner EVA/LLDPE heat seal layer 704, which forms the inner surface of the package 10.

As shown in FIG. 8, the adhesion promoting filler particles 706, which may be organoclay, is generally exaggerated in size for illustrative purposes, but is expected to be dispersed throughout the inner EVA/LLDPE or sealant layer 704, and it is expected that at least some of the adhesion promoting filler particles (identified as filler 708 in the drawing), for example, may have at least a portion thereof exposed or protruding slightly out of an outer surface 710 of the EVA/LLDPE layer 704, as generally provided in application Ser. No. 12/435,768, which is hereby incorporated herein by reference in its entirety. Alternatively, the adhesion promoting filler particles may not be exposed at the surface 708, but they may create a rougher outer surface, which increases the surface area for bonding to the adhesive. While not wishing to be limited by theory, the adhesion promoting filler particles 708 at the surface or exposed from the surface combined with corona treatment and/or the use of certain carriers for the filler may aid in the bonding of the fastener to the substrate, which may provide an effective primary bond to the substrate that is greater than the cohesive peel strength between the two adhesive layers 30 and 32. In general, when the cohesive peel force was less than approximately 600 g/inch to about 900 g/inch between the two adhesive layers 30 and 32, no delamination occurred during repeated peel/reseal cycles between the fastener and the substrate when the fillers and sealant constructions described herein were used. Thus, the primary bond of the adhesive layers 30 and 32 to the substrate with the adhesion promoting filler particles 706 therein is greater than about 600 gpli and, in some cases, greater than about 900 gpli as discussed previously.

In other instances and while not wishing to be limited by theory, the enhanced primary bond between the adhesive and substrate may be due to a diffusion of the liquid or uncured adhesive into gaps, voids, or other spacing of the adhesion promoting filler particles (such as the spacing between the organoclay platelets) and, in particular, into these gaps, void, or other spacing of the filler particles having at least a portion thereof exposed at the surface of the substrate. Upon subsequent polymerization, the diffused liquid adhesive forms into a solid adhesive that may be interlocked, tied or otherwise bound to the adhesion promoting filler particles to increase the primary bond to the substrate in yet other instances and again not wishing to be limited by theory, the enhanced primary bond may also be due to an affinity of the polar portions of the adhesive to the polar filler particles. In general, the filler particles are more polar than the substrate and, thus, provide a greater bond thereto.

With the adhesive based fastener and substrates described herein, an adhesive based reclosable fastener can be repeatedly opened and closed without delamination from the opposing panels 16 and 18, can be achieved in a fastener that is stable over time, and produces generally repeatable results even after fouling or contamination with foreign material, such as food crumbs. Even if the adhesive-based fastener is contaminated with food crumbs or edible oils, the adhesive-based fasteners herein do not exhibit an unusable drop-off in cohesive properties.

By one approach, the adhesive fasteners herein maintain a cohesive or self-adhesion peel strength when contaminated with product, food crumbs, oils, and the like between about 50 g/inch to about 900 g/inch, and exhibit a residual adhesion or residual cohesion after fouling or contamination of at least about 20%, and in some cases about 30% to about 150% of the cohesion peel levels prior to contamination. As used herein, adhesion remaining or residual cohesion is a measurement of the peel strength after direct contact of the adhesive surface to food particles, relative to the peel strength of a clean or uncontaminated fastener, exhibited as a percentage.

The reclosable fastener can be provided such that it can be peeled and resealed at least 5 to 10 times, and preferably more, yet still maintain its low tack and resealable characteristics. Furthermore, upon contact with itself, the reclosable fastener can recover all or some of its initial peel strength values. Depending on the final formulation of the adhesive coating used, the reclosable fastener can recover its peel strength in as little as two to three minutes between peel-reseal cycles. However, in some cases, shorter or longer time periods may be required to recover its peel strength between peel-reseal cycles. In some aspects, the peel strength of the reclosable fastener can actually increase upon prolonged contact between opposing adhesive layers.

Turning back to FIGS. 4-5B, to close the package 10 a user's fingers (or a machine closing operation during package filing operations) squeezes the front and back panels 16 and 18 together in the direction of arrows 33, as shown in FIG. 4, to engage the opposing adhesive layers 30 and 32 to form a cohesive bond therebetween to sealably close the package 10. To open the package 10, the user or a machine can peel back package portions 56 (FIG. 5B) positioned above the fastener 12 in opposite directions 57 to peel the adhesive layer 30 from the adhesive layer 32. By one approach, the layers 30 and 32 are configured to be closed and re-opened multiple times and, in some cases, the layers 30 and 32 preferably have sufficient structural and bond integrity to be closed and opened about 5 to about 10 times or more. However, particular layers and packages can be configured to be opened and closed any number of times depending on the particular configuration, coating weight, and other parameters of the cohesive layers and package substrate.

The package 10 having a reclosable fastener 12 can be used to store a wide variety of food and non-food items. Food items that may be stored can include snacks, such as trail mix, nuts, seeds, dried fruits, cereals, cookies, crackers, snack chips, chocolate, confections, and the like. The package 10 can also be used to store beverages, cheese, meat, cereal, ground coffee beans, desserts, pet food, and the like. Other possible applications of the package 10 can include packaging for various items that will benefit from resealability and permit multiple openings. This can include non-food items, such as potting soil, sandwich bags, first aid kits, nuts and bolts, office supplies, cleaning supplies, laundry supplies, disposable eating utensils, CDs and/or DVDs, toys, modeling supplies, art and craft supplies, electrical supplies, and the like. Many other examples are, of course, possible.

The adhesive fastener described herein can also be used for non-packaging applications, such as for consumer products that require a reusable fastener. For example, the adhesive fastener could be used as fasteners for disposable diapers, as fasteners on articles like athletic shoes, fasteners for jacket front openings, fasteners for pocket closures, or other types of clothing apparel, fasteners for office or school supplies such as folders and portfolios, closures on camping tents or back packs, as repositionable labels or markers for posters and maps for educational supplies/classroom instructional materials, fasteners for arts and crafts such as scrap-booking, repositionable fasteners for board game pieces, or repositionable strapping for bundling goods during shipping that are easy to apply and remove.

Turning to FIGS. 6 and 7, an example of a suitable process 500 that may be used to apply a coating to a substrate having the reclosable fastener 12 thereon is provided. A solvent coating, printing, rotogravure, or flexographic printing process can be provided to apply the layers 30 and 32 to the substrate 14. It will be appreciated that other application processes or methods may also be used as needed for a particular application. By this approach, the substrate having the closure thereon can be a film wound up into a roll that is later transferred to a form, fill and seal machine to form the package.

In this exemplary process 500, a supply of the substrate 14 may be provided in a large jumbo or roll 502 of base film, which may be a single layer or multi-layer film having EVA/LLDPE as the inner layer 504 to which the adhesives will be applied. The film is then unwound and directed to a first application station 506 where the adhesive fastening layer can be applied. For example, the liquid adhesive mixture may be applied to a first engraved roll or cylinder 510 that transfers the liquid PSA to a second or offset rubber roll cylinder 512 having an image or impression thereon 514 in the configuration, size, and shape of the adhesive strip to be applied to the film. The second cylinder 512 then transfers the PSA to the moving film substrate to form a first strip of the PSA containing material 516 on the web. The liquid PSA can have properties such as a viscosity between about 10,000 cPs to about 50,000 cPs at ambient temperature (20-25° C.), and less than about 2,000 cPs at about 70-75° C. When applying the liquid PSA coating, it can be preferred to apply the PSA coating at a temperature of about 160° F. (71° C.), but can be in the range of about 86° F. (30° C.) to about 190° F. (88° C.).

After passing through an oven section 520 (Which may be utilized to apply mild heating to assist with flow-out and leveling of the coating) the web 14 then may be directed to a UV-curing station 521 to cure the applied fastening layer. The UV station 521 can utilize UV-light energy at about 10 nm to about 400 nm wavelength and between about 100 mJ/cm$^2$ to about 800 mJ/cm$^2$ energy dose and, in some cases, about 400 mJ/cm$^2$ to about 730 mJ/cm$^2$. After the liquid coating layer has cured it is formed into the solid adhesive fastener 12 upon the package substrate 14. Then, if applicable to the particular form of package substrate 14, the substrate 14 may be wound up into an intermediate jumbo or roll 522 for storage or transfer to a subsequent package forming station, such as a form, fill, and seal process 600 as generally illustrated in FIG. 7.

Referring now to FIG. 7, an exemplary form, fill, and seal machine 600 using the intermediate roll 522 prepared from one form of the process 500 (which may be singulated or slit to an appropriate size prior to process 600) is illustrated to create one example form of a sealed package 602. In this example, a vertical bagger or flow wrapping process is used that wraps the substrate 14 around a filling tube 604. A first heat seal assembly 606 can form a first machine-direction heat seal 607. A second transverse-direction heat seal assembly 608 with an integral trim tool can then form second and third transverse-direction heat seals 609 and 611. As shown in FIG. 7, the seal 609 is below an adhesive reclose fastener 613 created as described above, but the seal 609 may also be above or both above and below the adhesive reclose fastener 613. Finally, an integral trim tool within the transverse-direction heat seal assembly 608 can cut the substrate 14 between the adhesive recluse fastener 613 and the bottom seal 611 of an adjacent package thereby separating the package that was just filled and sealed from the following package that is in the process of being filled. It will be appreciated that the exemplary processes of FIGS. 6 and 7 are only but one example of suitable methods of forming and/or filling packages having the UV-cured adhesive reclosable fastener 12 thereon. Other formation methods may also be used as needed for a particular application.

Optionally, the coating mixture used to form the UV-cured, adhesive-based reclosable fastener 12 may include one or more additives or inert colorants to change the appearance of the fastener 12. For example and by one approach, the fastener 12 may include titanium dioxide. Such optional additives may help identify the strips of adhesive on the opposing panels by making the adhesive more opaque, which may help make it easier for a consumer to re-seal the fastener because the consumer will be able to locate the opposing fastener strip easier.

In some aspects, a package can be created in accordance with a method 800 and/or a method 900 as generally shown in FIGS. 9 and 10. By one approach, as generally shown in FIG. 9, the low tack adhesive, configured as described above, is applied 802 to a package substrate in a suitable pattern to dispose the adhesive-based fastener 20 thereon. The low tack adhesive is then cured 804, such as, for example, by UV-curing on the package substrate. Once the adhesive-based fastener 20 is applied and cured, the package substrate can be formed 806 into the particular construction of the package 10, which can take any suitable form, including those shown in FIGS. 1-3. Once formed, the package 10 can then be filled, such as with food products or the like. Alternatively, the package can, in some instances, be formed first and have the adhesive applied thereon.

By another approach, as shown in FIG. 10, a method 900 of preparing a package substrate, which may be suitable for forming a more rigid package such as those shown in FIGS. 3A-3C, is shown. First, graphics, coatings, layers, and/or alphanumeric content may be printed or otherwise applied 902 on various inner or outer surfaces of the package substrate, which can be paperboard or the like. This can also include printing 902 an overlacquer a polymer coating, or the like onto the package substrate as described above. The overlacquer or coating may include the filler as described above if needed to enhance bonding of the adhesive to the package. This application can be done via any suitable process, including a slot-die coating process, a flexo process, or a gravure process, for example. The printing and/or coating is then allowed to dry 906 so that the low tack adhesive, such as that discussed above, can be applied 906 to the substrate by a suitable process, such as a slot-die coating process, flexo process, or a gravure process and the like. The low tack adhesive is then cured 908. After curing, the package substrate is then cut 910 into one or more blanks or other package structure by any suitable device, such as one or more dies, rotary dies, lasers, etc., and stored for future use. When use is desired, the blanks are delivered 912 to the packaging line. Alternatively, the blanks can be formed in-line with the packaging line. On the packaging line, the desired package form is created 914 by folding the blanks about the various fold lines, applying permanent adhesive at overlapping portions, and adhering the overlapping portions together. Once the package is created, they can then be filled 916 with one or more products, such as food products, and closed for storage, shipping, and display. The filled packages are then wrapped 918 in a clear overwrap film and assembled and sealed 920 with other wrapped packages in an outer master pouch or package. Multiple outer master pouches or packages are packed 922 into one or more cases and shipped to a customer, retail store, or the like. Alternatively, the low tack adhesive may be applied later in the process, such as after the die cut step 910, after the forming step 914, and/or after the filling step 918 as needed for a particular application.

In another approach, the low tack reclosable adhesives described herein may have tack values (or at least a tack perception) and/or surface energy substantially similar to that of the packaging substrate without the low tack adhesive. For example, the low tack reclosable adhesive, when touched by the consumer, may have a tack level or at least a perceived tack level substantially the same as the uncoated substrate or film adjacent thereto. By one approach, this may be evidenced by a rolling ball tack test where tack values of the low tack adhesive are substantially the same as tack values of the uncoated film. For example, values of the rolling ball tack test (as described in the Examples herein) for the low tack adhesive may be up to about 14 inches of ball travel. The uncoated film (that is, no adhesive) may exhibit a rolling ball tack value of about 16-17 inches (on average) of ball travel. In some cases, the rolling ball tack test results of the low tack adhesive may be only about 12 to about 17% lower than the uncoated film.

In other approaches, the similarity of the surfaces of the adhesive and uncoated film may be evidenced by a surface energy of the low tack adhesive that may be substantially similar to the uncoated film. By one approach, for example, the surface energy of the low tack adhesive and the uncoated film may both be about 36 to about 38 dynes/cm, and, in other cases, about 36 dynes/cm.

Advantages and embodiments of the fastener and package described herein are further illustrated by the following examples; however, the particular conditions, processing schemes, materials, and amounts thereof recited in these examples, as well as other conditions and details, should not be construed to unduly limit the fastener, package, and methods. All percentages are by weight unless otherwise indicated.

EXAMPLES

Example 1

Various blends of acrylic oligomers, tack control agents and elastomeric materials were tested for compatibility and storage stability (stability being defined as a mixture that does not form gels or visibly separate after storing for up to 3 days at room temperature). Table 1 below shows the combinations tested and the formulation levels used.

TABLE 1

Adhesive Formulations Tested for Stability

% Component Provided in Final Adhesive Formulation

| Sample No. | Acrylic Oligomer A | Elastomer B | Tack Agent C | Elastomer D | Tack Agent E | Tack Agent F | Adhesive Component Ratio (ACR) | Storage Stability of Liquid Blend |
|---|---|---|---|---|---|---|---|---|
| | | | | | | | | Observation after 3 days |
| 1 (Inventive) | 40 | 15 | 45 | — | — | — | 0.67 | Stable, no visible gels, no phase separation |
| 2 (Comparative) | — | 15 | 45 | — | 40 | — | 0 | Stable-but did not cure because too low ACR |
| 3 (Comparative) | 40 | — | 45 | 15 | — | — | 0.67 | Unstable, because phases separated; components were incompatible |
| 4 (Comparative) | — | — | 45 | 15 | 40 | — | 0 | Unstable, because phases separated and ACR too low |
| 5 (Inventive) | 40 | 15 | 25 | — | — | 20 | 0.67 | Stable; no visible gels, no phase separation |
| 6 (Comparative) | 40 | 15 | — | — | — | 45 | 0.67 | Unstable, because phases separated; components were incompatible |
| 7 (Comparative) | 60 | — | — | — | — | 40 | 1.5 | Unstable, because phases separated |
| 8 (Comparative) | — | — | — | — | 60 | 40 | 0 | Unstable, gel-like structure formed and ACR too low |

The components are identified as follows:
A = acrylated epoxidized soybean oil (CN 111 US, Sartomer Company, Exton, PA).
B = methacrylated polybutadiene (Ricacryl ® 3500, Sartomer Company).
C = tackified aliphatic acrylate oligomer (CN 3001, Sartomer Company). This component comprises a blend of an aliphatic urethane acrylate and hydrocarbon tackifier resins.
D = polybutadiene styrene copolymer (Ricon, 184, Sartomer Company).
E = tackified aliphatic urethane acrylate oligomer (CN 3211, Sartomer Company).
F = tackifier concentrate made with a light colored, low odor aromatic resin (PRO 11236, Sartomer Company).

$$\text{Adhesive Ratio (ACR)} = \frac{(\text{wt \% Acrylic Oligomer})}{(\text{wt \% Elastomer} + \text{wt \% Tackifier})}$$

Stability or compatibility of these adhesive components may be a factor for manufacture, shipping, in-plant storage, and use of the liquid coating mixture. The stability was judged visually by appearance and consistency of the observed formulation after storage over a period of 3 days (about 72 hours). It was observed that Samples 1, 2 and 5 in Table 1 provided visually satisfactory blends of the various adhesive components that after 3 days remained homogeneous, i.e., the components did not visibly separate or form gels. Although Sample 2 resulted in a stable formulation, this adhesive component had an undesired ACR and did not cure well this can be seen from the MEK RUE) Cure test in Table 3 below, for similarly formulated Sample 10). However, Samples 1 and 5 provided stable adhesive blends that cured well and also had a desired ACR in the range of 0.5 to 1.5. The other sample blends either separated, became too viscous and/or gelled (i.e., Sample 8 became gel-like after 3 days). Sample 8 formed a gel, which indicated that the composition formed by the aliphatic acrylate, or component E, combined with the tackifier component F was not compatible.

Thus, to achieve a stable adhesive that is appropriate for use as disclosed herein, the stable adhesive generally needs to have one of the following and, in some cases, more than one of the following, and in other cases, all of the following factors: compatible components, curable, desired ACR, and all three component parts present (i.e., acrylic oligomer, elastomer, and a tack control agent).

Example 2

Based on the initial adhesive compatibility results for the stable formulations from Example 1, these formulations were further refined to produce five formulations of adhesive coatings that were all stable for at least 24 hours as a blend of the components indicated in Table 2.

TABLE 2

Revised Adhesive Formulations

% Component Provided in Final Adhesive Formulation

| Sample No. | Acrylic Oligomer A | Elastomer B | Tack Agent C | Elastomer D | Tack Agent E | Tack Agent F | Adhesive Component Ratio (ACR) | Stability after 24 hours |
|---|---|---|---|---|---|---|---|---|
| 9 | 40 | 15 | 45 | — | — | — | 0.67 | Yes |
| 10 | — | 15 | 45 | — | 40 | — | 0 | Yes |
| 11 | 40 | 15 | 20 | — | — | 25 | 0.67 | Yes |
| 12 | 50 | — | 45 | 5 | — | — | 1 | Yes |
| 13 | 45 | — | 45 | 10 | — | — | 0.82 | Yes |

The components A through F are as indicated above in Example 1. Samples 9 and 10 correlate to Samples 1 and 2, respectively, from Example 1. Sample 11 is a variation of Sample 5 from Example 1. The remaining sample formulations were new.

After the five adhesive formulations exhibited good compatibility for at least one day, the five samples were all combined with about 1% of a photoinitiator (Esacure® KTO 46, Lamberti Spa, Italy) and then tested further. The photoinitiator was comprised of a liquid mixture of trimethylbenzoyl-diphenyl phosphine oxide, α-hydroxyketones and benzophenone derivatives. The samples were then coated onto film substrates comprising ethylene vinyl acetate copolymer (EVA), Metallocene low linear density polyethylene (LL-DPE) and about 12 percent of an organoclay composition (about 57-63% organically modified clay and maleic anhydride grafted linear low density polyethylene carrier, PolyOne Corporation, McHenry, Ill.). In particular, the substrate had about 77 wt % (EVA), about 10 wt % Metallocene LLDPE, and about 13 wt % organoclay composition. The samples were then cured after being coated onto the film substrates, where the curing was effected by application of UV radiation with three passes under a "D" bulb, which is a mercury with iron halide bulb. A single pass under a D bulb was approximately equivalent to 75 mJ/cm$^2$ to 100 mJ/cm$^2$. After the coating was cured, the cured adhesive layer was evaluated for the degree of cure and effectiveness to bond to the film.

The degree of cure of the adhesive was tested using a solvent rub resistance test referred to as a methyl ethyl ketone (MEK) rub test, as per ASTM D5204. Good cure results were shown by an MEK rub value of 100 double rubs or more, which indicated that the adhesive was cured well and thus showed a resistance to the MEK rubbed over it. Poorly cured adhesives did not show much resistance to the MEK (e.g., 10 double rubs or less). MEK nib test results can be seen in Table 3 below.

Tack and initial peel of the adhesives were also observed, and reported subjectively. The tackiness of the adhesive layer was observed upon touching and the level of tack was evaluated on a scale of Low (L), Medium (M), and High (H). Similarly, the subjective force required to peel apart the samples by hand was also evaluated on a scale of L, M, and H. These test results can be seen in Table 3.

TABLE 3

Test Results for Cure and Preliminary Adhesion for Table 2 Formulations.

| Sample No. | MEK Rub Test (# of double rubs) | Subjective Tack Test | Subjective Peel Test |
|---|---|---|---|
| 9 (Inventive) | >100 | M | M |
| 10 (Comparative) | ~10 | M-H | M-H |
| 11 (Inventive) | >100 | M | M |
| 12 (Comparative) | 100 (Haze on surface) | M | M |
| 13 (Comparative) | 100 (Haze on surface) | M-H | M-H |

All of the samples had at least moderate tackiness and peel strength. Sample 10 had the highest subjective tack and peel but the poorest cure, as evidenced by an MEK rub test of about 10, which showed that after about 10 rubs of MEK the adhesive was removed from the substrate. Samples 12 and 13 had a haziness upon performing the MEK rub test, most likely due to component D, the polybutadiene styrene copolymer, rising to the surface when rubbed with MEK. Therefore, although Samples 12 and 13 fall within the desired adhesive ratio range, component D does not appear to be compatible with the other two components and thus is not a satisfactory adhesive compound. It was desirable to find an adhesive with a subjective tack result of medium or lower, subjective peel force of medium or higher and an MEK rub test of 100 double rubs or greater without haze formation, which at a minimum, Samples 9 and 11 exhibited.

Example 3

The curing effectiveness of three different variations of an adhesive formulation were tested by applying the adhesive to the same film substrate as described in Example 2 and then curing in three different manners; a UV-curing step ("UV Cure") performed on commercial equipment, an electron beam (EB) curing step ("EB Cure") performed on a similar commercial system as the UV-cure but utilizing electron beam technology, and an EB cure performed on laboratory equipment ("EB Lab Cure"). Table 4 below shows the formulation of the three adhesives tested. The commercial EB system and lab EB system are both compared due to the varying energy levels supplied by each. The acrylic oligomer is CN 111 US, the elastomer is Ricacryl® 3500 and the tackifier is CN 3001 as described in Example 1.

TABLE 4

Sample Adhesive Formulation

% Provided in Final Adhesive Formulation

| Sample No. | Acrylic Oligomer | Elastomer | Tack Agent | Adhesive Component Ratio (ACR) |
|---|---|---|---|---|
| 14 (Comparative) | 69.2 | 7.7 | 23.1 | 2.2 |
| 15 (Inventive) | 45 | 15 | 40 | 0.81 |
| 16 (Inventive) | 35 | 15 | 50 | 0.53 |

The "UV Cure" comprised passing the coated sample under a UV-lamp at about 25 ft/min in air and with about 2 to 4 passes, such that the sample was passed under the length of the UV-lamps 2 to 4 times. The energy provided by 1-pass of the UV lamp at 25 ft/min was equivalent to about 100 mJ/cm$^2$. The "EB Cure" on a commercial system (Faustel Corporation, Germantown, Wis.) was performed under nitrogen gas at about 125 ft/min to about 250 ft/min with only one pass and at about 2 Mrad to about 2.4 Mrad, and the "EB Lab Cure" was also performed under nitrogen requiring about 6 to 8 passes under the lab EB system, which operated at about 10 ft/min. Total cumulative dose for 6-8 passes through the lab EB unit was about 2 Mrad to about 4 Mrad. It is appreciated that a smooth surface finish of the adhesive fastener 12 is desired in some cases for a good adhesive to adhesive peel strength. If the surface of the adhesives 12 is lumpy, such as having a consistency of an orange peel, the adhesive fasteners 12 tend not to adhere together well. It was observed that all cured coating samples had comparably smooth and level surface finishes. After curing all of the samples, the peel strengths were tested per ASTM D3330/D3330M-04 method F, these results are shown in Table 5 below.

TABLE 5

Peel Strength Results for Different Cure Processes (UV vs. E-beam)

Peel Strength Results

| | Inventive | | Comparative | | | |
|---|---|---|---|---|---|---|
| Sample No. | Peel Strength under UV Cure Condition | No. UV Passes | Peel Strength under EB Cure Condition | No. EB Passes | Peel Strength Under EB Lab Cure Conditions | No. EB Lab Passes |
| 14 (Comparative) | 200 gpli | 2 | 0 gpli | 1 | 100 gpli | 6-8 passes |
| 15 (Inventive) | 480 gpli | 3.5 | 0 gpli | 1 | 200 gpli | 6-8 passes |
| 16 (Inventive) | 680 gpli | 4 | 0 gpli | 1 | 200 gpli | 6-8 passes |

Surprisingly, it was found that an ultraviolet curing treatment (UV Cure) outperformed both of the EB cures. The EB Cure performed on the commercial line had no adhesion at all, peel strength of 0 gpli. The EB Lab Cure had some adhesion, but the UV-cured samples had the best adhesion overall.

In terms of the UV Cure results, Samples 15 and 16 had acceptable ranges of peel strengths (i.e., 480 gpli and 680 gpli respectively) whereas Sample 14 had a lower peel strength (i.e., 200 gpli). The lower peel strength seen in Sample 14 is likely due to the adhesive formulation used with Sample 14, which did not fall within the desired range of 0.5 to 1.5 (i.e., it had a ratio of 2.2).

While not wishing to be limited by theory, it is believed that a UV-radiation cure in ambient air (about 21% oxygen) provides a cure from the bottom of the sample up toward its surface due to the oxygen inhibition of free radical curing in adhesive portions adjacent or near the surface. The tacky components are more aliphatic in nature and therefore are lower in surface energy than, for example, the ester or urethane components. In some cases, chemical systems self-organize to the lowest possible energy state if allowed sufficient time. In the present case, it is believed that the slower cure rate of the UV process allows sufficient time for the tacky components of the coating to migrate toward the surface. In contrast, the EB curing process results in a much faster reaction cure rate, thus providing a more random arrangement of the polymer where it sets up cross-links within the growing polymer network too quickly for significant surface-energy driven self-ordering to develop. Thus, the EB cure may have an opposite cure pattern than the UV-radiation process, where EB curing commonly takes place in a nitrogen-purged environment and may cure faster at the surface and slower near the substrate. This can result in a completely different adhesive behavior based solely on the different cure methods. Ordinarily, such a rapid cure would be desirable, however, when curing the coating disclosed herein, such a fast cure is a disadvantage because it does not allow sufficient time to transpire in the process for the adhesive components to become fully organized.

While not wishing to be limited by theory, it is further believed that the slower cure time of the UV radiation curing allows for the growing polymer units to arrange themselves, such that polar units of the polymer favor the substrate and non-polar units favor the surface, where having the non-polar units near the surface of the substrate allows the adhesive coating to bond and stick to itself. This allows the adhesive components that are most compatible with the film substrate to congregate at the adhesive/substrate interface, thus enhancing the substrate adhesion, which may be one factor that aids in the absence of delamination from the substrate film.

Example 4

Two inventive adhesive-based reclosable fasteners, Samples 17 and 18, were prepared as indicated in Table 6. The two sample adhesives were compared to a standard pressure sensitive adhesive fastener (PSA-control, Sample 19) obtained from a commercial Nabisco Chips Ahoy Snack'n Sear package using a standard PSA (Fasson 5700, Avery Dennison Corp., Pasadena, Calif.).

that would be consistent with what would be found in the bottom of a bag. Next, a 2 inch diameter ring fixture was placed onto the adhesive of the sample to be tested. Approximately 5 grains of crumbs were placed into the ring on the sample. The sample and ring were gently agitated back and forth to settle the crumbs onto the adhesive surface of the reclosable fastener. The ring was removed from the sample and the crumbs were gently shaken off of the sample and disposed. The ring was replaced back on the substrate in its original position and the area exposed to the crumbs was visually rated for the quantity of crumbs retained. A visual rating scale of zero to 100 was used, where zero meant no visible retained crumbs and 100 meant the total surface was covered with adhering crumbs. The results of the cracker crumb test are shown in Table 7.

Additionally, the peel strength of the adhesives was tested after contaminating with cracker crumbs. The peel strength

TABLE 6

Adhesive-based Fastener Formulations

% Component Provided in Final Adhesive Formulation

| Samples | CN 111 US (Acrylic Oligomer) | Ricacryl ® 3500 (Elastomer) | CN 3211 (Tack Agent) | Esacure ® KTO46 (Photoinitiator) | Adhesive Component Ratio (ACR) |
|---|---|---|---|---|---|
| 17 (Inventive) | 35 | 12 | 50 | 3 | 0.56 |
| 18 (Inventive) | 35 | 0 | 62 | 3 | 0.56 |

The substrate that was coated comprised about 77.2% EVA, about 10% metallocene LLDPE, and about 12.8% organoclay filler composition PolyOne 231-615 masterbatch. The masterbatch comprises about 57% to about 63% organically modified clay and a carrier that contains MA-LLDPE and polyethylene. Sample 17 was cured at a UV-curing station having an average light energy of about 730 mJ/cm$^2$ and an average line speed of about 100 ft/min at an average oven temperature of 130° F. Sample 18 was cured at the UV-curing station having a light energy of about 700 mJ/cm$^2$ with a line speed of about 100 ft/min at an oven temperature of 160° F.

was measured using a standard testing procedure, ASTM D3330/D3330M-04 method F, where the strength of the adhesive bond was tested by peeling one side away from the other and measuring the peel strength that was required. An initial peel strength, a subsequent peel strength after an initial contamination with cracker crumbs, and a second peel strength after a second round of contamination with cracker crumbs, where the sample was contaminated using the same procedure as the initial contamination, were measured. The results for the samples are presented in Table 7.

TABLE 7

Crumb Contamination Test Results

| Samples | Initial peel strength (no contamination) (gpli) | Peel strength after first contamination (gpli) | % Peel strength retained after first contamination | Peel strength after second contamination (gpli) | % Peel strength retained after second contamination | Contamination rating |
|---|---|---|---|---|---|---|
| 17 | 315 | 167 | 53% | 128 | 41% | 0-10 |
| 18 | 116 | 161 | 138% | 155 | 133% | 0-10 |
| 19 (PSA-Control) | 499 | 196 | 39% | 25 | 5% | 60-80 |

The standard adhesive, PSA-control, was already provided in a final form adhered to a cookie package (Kraft Foods).

A crumb contamination test was performed on all three packages to see if the food particles would negatively impact the sealing of its respective adhesive. The crumb test procedure comprised the following steps: first, Triscuit® crackers were obtained and crushed using a bottom of a glass jar. The breaking of the crackers in this fashion created small particles It can be seen from the results that the adhesivity (i.e., peel strength) of the PSA-control, as measured per ASTM test D3330/D3330M-04 method F, dropped to about 5% of its initial peel force value (i.e., from about 500 gpli to about 23 gpli) after only two cracker crumb exposures. In contrast, both of the adhesive-based Samples 17 and 18 retained at least about 41% of its initial peel force value after two exposures to the cracker crumbs, with Sample 18 actually showing an increase in peel force after contamination and after repeated closures and openings. Additionally, the visual crumb contamination ratings for the adhesive-based samples were 0 to 1.0, compared to values of 60 to 80 for the PSA-control.

A rolling ball tack test was also performed on uncontaminated Samples 17, 18, and 19, which was a modified version of ASTM D3121 and followed the test method parameters of ASTM D3121, unless otherwise specified. The modified test measured how strong the surface of the coating adhered to non-like materials, such as the polar surface of a rolling glass ball.

The rolling ball method included: releasing a glass ball which was placed two inches up the standard incline specified in the ASTM method and allowing the ball to accelerate down the incline and roll across a horizontal surface of the pressure sensitive adhesive sample. The modified test version included using a glass ball instead of a metal ball, the glass ball having a diameter of about 1/8 inch, and using a shortened release point off of the incline (as indicated above, two inches up the incline). The relative tack was determined by measuring the distance the ball traveled across the adhesive before stopping, beginning from the end of the ramp. A longer rolling ball travel distance indicated lower tack to the polar surface of the glass ball, and indicated that the coating has a lower tendency to stick to rollers and metal surfaces on packaging machines, compared to coatings with a shorter rolling ball travel distance which indicated a higher tack level. A longer rolling ball travel distance may also correlate to a lower tendency to adhere to food crumbs. In this measurement, the measurement was limited to a maximum of 4 inches because the maximum sample size available for testing was 4.0 inches× 4.0 inches. Results from the rolling ball tack test are shown at Table 8.

TABLE 8

Rolling Ball Tack Test Results

| Samples | Rolling Ball Distance (Inches) |
|---|---|
| 17 | >4 |
| 18 | >4 |
| 19 (PSA-Control) | 1/8 |

From the results, it can be seen that the two inventive Samples 17 and 18 had lower surface tack than the control, as evidenced by the glass ball easily rolling across the surface of the reclosable fastener and off of the 4 inch long sample. On the contrary, the glass ball stuck to the PSA-control almost immediately upon contacting the PSA-control surface, which was indicative of a high tack surface of the coating.

Example 5

A peel repetition test was performed to test the reseal and peel ability over multiple repetitions. Approximately twenty samples were made; Samples 20 to 35 were made using the adhesive formulation of Sample 17 from Example 4, and Samples 36 to 38 were made using the adhesive formulation of Sample 18 from Example 4. Samples were produced on a commercial scale pilot coating line via the flexographic coating process. The liquid adhesive coating system was preheated to 160° F. (71° C.) and circulated through a chambered doctor blade which was mounted to an engraved chromium oxide ceramic roll. The engraved roll (which was also temperature-controlled to 160° F. (71° C.)) transferred the liquid adhesive coating to a patterned rubber roll. The patterned rubber roll in turn transferred the patterned coating to the moving substrate film (i.e., the process illustrated in FIG. 6). After exiting the coating station, the film traveled through a 60 ft. long oven section. A UV treater, consisting of 3 banks of UV lamps, was located at the oven exit. The line configuration with the UV zone located at the exit end of the oven resulted in the maximum path length between the coating station where the material was applied and the UV curing station, which maximized the amount of time available for the liquid adhesive coating to flow-out and level, prior to being cured into a cross-linked polymer network. It is believed that, in some cases, a smooth and coating surface helps to achieve the desired adhesive to adhesive peel force in the fully cured adhesive.

A series of experimental coating runs were performed. Line speed, oven temperature, and the number of UV lamp banks were varied. The experimental design and experimental observations are summarized in Table 9 below. Visual surface roughness, MEK resistance, and separation of adhesive along the adhesive-to-adhesive bond line of the sample prior to testing were determined. In general, samples produced at 300 ft./min. to 500 ft./min. line speed had a rough surface appearance and low or no subjective peel force. Instrumented peel force measurement of these samples was for the most part not possible because the joined samples separated on their own accord before further tests could be carried out. Samples produced at 100 ft./min. had a smooth surface appearance and moderate adhesive to adhesive peel force. These samples were further characterized using instrumented peel force testing as summarized in Tables 10 and 11 to follow. Only the samples that did not separate on their own, as shown in Table 9, were tested in the repeated peel-reseal tests. These were Samples, 21, 22, 29, 30, 31, 32, 35, 36 and 38,

TABLE 9

Experimental Design Used to Produce Samples for Peel Repetition Testing

| Sample No. | Adhesive-Based Sample No. | Line Speed (ft/min) | Oven Temperature (° F.) | No. of UV lamp banks | Visual adhesive surface appearance | MEK Rub Test (# of double rubs) | Joined samples separated |
|---|---|---|---|---|---|---|---|
| 20 | 17 (Ex. 4) | 500 | 100 | 3 | Very Rough | 15 | Yes |
| 21 | 17 (Ex. 4) | 100 | 100 | 1 | Smooth | 100+ | No |
| 22 | 17 (Ex. 4) | 100 | 100 | 3 | Smooth | 100+ | No |
| 23 | 17 (Ex. 4) | 500 | 100 | 1 | Very Rough | 5 | Yes |
| 24 | 17 (Ex. 4) | 300 | 100 | 2 | Very Rough | 100+ | Yes |
| 25 | 17 (Ex. 4) | 500 | 130 | 2 | Very Rough | 60 | Yes |

TABLE 9-continued

Experimental Design Used to Produce Samples for Peel Repetition Testing

| Sample No. | Adhesive-Based Sample No. | Line Speed (ft/min) | Oven Temperature (° F.) | No. of UV lamp banks | Visual adhesive surface appearance | MEK Rub Test (# of double rubs) | Joined samples separated |
|---|---|---|---|---|---|---|---|
| 26 | 17 (Ex. 4) | 300 | 130 | 2 | Very Rough | 100 | Yes |
| 27 | 17 (Ex. 4) | 300 | 130 | 3 | Very Rough | 100 | Yes |
| 28 | 17 (Ex. 4) | 300 | 130 | 1 | Very Rough | 20 | Yes |
| 29 | 17 (Ex. 4) | 100 | 160 | 1 | Smooth | 100+ | No |
| 30 | 17 (Ex. 4) | 300 | 160 | 2 | Slightly Rough | 100+ | No |
| 31 | 17 (Ex. 4) | 100 | 160 | 2 | Smooth | 100+ | No |
| 32 | 17 (Ex. 4) | 100 | 160 | 3 | Smooth | 100+ | No |
| 33 | 17 (Ex. 4) | 500 | 160 | 1 | Very Rough | 5 | Yes |
| 34 | 17 (Ex. 4) | 500 | 160 | 3 | Very Rough | 100 | No |
| 35 | 17 (Ex. 4) | 100 | 130 | 2 | Smooth | 100+ | No |
| 36 | 18 (Ex. 4) | 100 | 160 | 3 | Smooth | 100 | No |
| 37 | 18 (Ex. 4) | 500 | 160 | 3 | Rough | 100 | Yes |
| 38 | 18 (Ex. 4) | 300 | 160 | 3 | Rough | 100 | No |

The first set of peel tests were performed using short intervals between peels, about three minutes between a peel-reseal cycle. Table 10 includes results for this test, where the averages of two samples tested per condition are provided. These results are compared to Sample 19, the PSA-control from Example 4.

TABLE 10

3-Minute Delay Peel-Reseal Test Results

Peel Strength Value (gpli)

| Peel No. | Sample 19 PSA-Control | Sample 21 | Sample 22 | Sample 29 | Sample 30 | Sample 31 | Sample 32 | Sample 35 | Sample 36 | Sample 38 |
|---|---|---|---|---|---|---|---|---|---|---|
| 1 | 459.8 | 291.8 | 461.8 | 273.3 | 148.0 | 266.7 | 417.4 | 418.3 | 273.9 | 136.9 |
| 2 | 320.8 | 74.0 | 242.1 | 131.6 | 32.5 | 129.7 | 206.3 | 195.8 | 527.2 | 43.0 |
| 3 | 275.0 | 52.4 | 204.4 | 111.5 | 27.1 | 112.9 | 180.8 | 171.9 | 452.9 | 44.8 |
| 4 | 254.7 | 51.8 | 183.2 | 107.6 | 24.2 | 104.1 | 158.6 | 141.6 | 424.7 | 41.1 |
| 5 | 256.9 | 48.7 | 161.8 | 99.2 | 23.7 | 102.3 | 140.5 | 128.8 | 404.6 | 41.8 |

The second set of peel tests were performed using a longer duration interval between peels, i.e., about 24 hours between peel-reseal cycles, in order to understand the impact of longer adhesive-adhesive contact time, with the first peel taking place about one week after the samples were prepared. The test results for the extended delay peel-reseal samples are shown at Table 11.

TABLE 11

24-Hour Delay Peel-Reseal Test Results

Peel Strength Value (gpli)

| Peel No. | Sample 19 PSA-Control | Sample 21 | Sample 22 | Sample 29 | Sample 30 | Sample 31 | Sample 32 | Sample 35 | Sample 36 | Sample 38 |
|---|---|---|---|---|---|---|---|---|---|---|
| 1 | 539.8 | 271.1 | 441.7 | 288.8 | 149.2 | 301.9 | 434.7 | 432.5 | 277.3 | 124 |
| 2 | 521.6 | 202 | 362.1 | 238.5 | 116.2 | 147 | 327.6 | 338.7 | 447.4 | 107.3 |
| 3 | 514.6 | 233.1 | 349.6 | 248.3 | 115.8 | 226.3 | 297.6 | 321.6 | 478.5 | 106.5 |

TABLE 11-continued

24-Hour Delay Peel-Reseal Test Results

Peel Strength Value (gpli)

| Peel No. | Sample 19 PSA-Control | Sample 21 | Sample 22 | Sample 29 | Sample 30 | Sample 31 | Sample 32 | Sample 35 | Sample 36 | Sample 38 |
|---|---|---|---|---|---|---|---|---|---|---|
| 4 | 550.3 | 218.2 | 314.8 | 222.2 | 95.5 | 239 | 286.5 | 289 | 493.9 | 116.8 |
| 5 | 567 | 231.9 | 285.9 | 236.9 | 95.9 | 224 | 299.9 | 280.4 | 487.5 | 125.1 |

The results show that the samples including adhesive formulation of Sample 17 from Example 4 do not exhibit as pronounced of a decrease in peel force that typically occur with repeated peels when the duration between peels was 24 hours (i.e., Samples 21, 22, 29, 30, 31, 32, and 35 in this example). When the adhesive Sample 17 was allowed to remain in contact with itself for about 24 hours between peels, the adhesive recovered up to about 85% of its original peel force value, even after five peel-reseal cycles. Sample 30 had significantly lower average peel force values compared to the other test samples. Even though the joined samples did not separate on their own accord, it had poor surface smoothness due to the higher line speed of 300 ft/mitt.

Furthermore, it was surprising to find that the samples including adhesive formulations of Sample 18 from Example 4 actually increased in peel force value (i.e., Sample 36 in this example) with repeated peels at both the short and long time intervals between peel test cycles, similar to its contamination peel test results in Table 7, evidence of a full recovery of peel force after resealing. Only Sample 36 showed an increase in peel force value. Sample 36 was the sample cured using the slower line speed, which may have helped to provide a level and smooth sample surface (see Table 9). Sample 38 was made at a higher line speed than Sample 36 resulting in a rougher surface, which may be why there was a decrease in peel force value, as well as a low initial peel force value.

In comparison, the PSA-control showed recovery behavior only when the interval between peels was long, i.e., 24 hours. At the shorter time interval, the control actually dropped in peel force, by about 40%.

Overall, for both peel-reseal tests, the best performers were Samples 22, 32, 35 and 36. These four samples all correlated to adhesives made with similar processing conditions. For example, all four samples had slow line speeds of 100 ft/min, with at least two or more banks of UV lamps turned on. The adhesives that failed the peel-reseal tests likely did not have sufficient time to flow out and level prior to UV curing.

Example 6

An aging study was conducted using the adhesive Samples 17 and 18 of Example 4, Table 6 in order to understand the effects of longer adhesive to adhesive contact time on peel performance. Various properties of the adhesive were tested over a seven-week period including subjective initial peel force (i.e., low, medium, high), visual appearance after peeling, subjective tack or tendency to stick to fingers (i.e., none, low, medium, high), coating durability (i.e., MEK solvent resistance test ASTM D5204), and instrumented peel (i.e., 5 consecutive peels repeated on same sample at intervals of about 3 minutes using ASTM D3330/D3330M-04 method F; two samples were tested and averaged together) all at various adhesive to adhesive contact times. The adhesives were coated onto the same film substrates that were used in Example 2. Table 12 below shows the aging results for Sample 17. Table 13 below shows the aging results for Sample 18.

TABLE 12

Summary of Aging Study of Sample 17

| Test Performed | Day 0 | Day 3 | Week 1 | Week 2 | Week 3 | Week 4 | Week 5 | Week 6 | Week 7 |
|---|---|---|---|---|---|---|---|---|---|
| Subjective Initial Peel Force | H | H | H | H | H | H | H | H | H |
| Change in appearance after peeling | No change to adhesive appearance | No change to adhesive appearance | No change to adhesive appearance | No change to adhesive appearance | Spotty surface whitening | Spotty surface whitening | Spotty surface whitening | Spotty surface whitening | Spotty surface whitening |
| Subjective Tack | Low | Low | Low | Low | None | None | None | None | None |
| MEK Rub (# of double rubs) | >100 | >100 | >100 | >100 | >100 | >100 | >100 | >100 | >100 |
| 1st Peel Avg. g/in | 553 | 567 | 559 | 553 | 463 | 600 | 323 | 505 | 592 |
| 2nd Peel Avg. g/in | 370 | 381 | 377 | 382 | 343 | 375 | 241 | 311 | 348 |
| 3rd Peel Avg. g/in | 339 | 354 | 347 | 361 | 333 | 352 | 228 | 300 | 335 |
| 4th Peel Avg. g/in | 318 | 342 | 340 | 338 | 330 | 326 | 232 | 292 | 326 |

TABLE 12-continued

Summary of Aging Study of Sample 17

| Test Performed | Day 0 | Day 3 | Week 1 | Week 2 | Week 3 | Week 4 | Week 5 | Week 6 | Week 7 |
|---|---|---|---|---|---|---|---|---|---|
| 5$^{th}$ Peel Avg. g/in | 311 | 322 | 326 | 323 | 311 | 297 | 226 | 277 | 317 |
| Avg. Peel Strength g/in of 5 peels | 378 | 393 | 390 | 391 | 356 | 390 | 250 | 337 | 384 |

TABLE 13

Effect of Adhesive/Adhesive Contact Time on Repeat Peel Performance (Sample 18)

| Test Performed | Day 0 | Day 3 | Week 1 | Week 2 | Week 3 | Week 4 | Week 5 | Week 6 | Week 7 |
|---|---|---|---|---|---|---|---|---|---|
| Subjective Initial Peel Force | H+ | H | H | H | H | H | H+ | H+ | H+ |
| Appearance change after peeling | No change to adhesive appearance | No change to adhesive appearance | No change to adhesive appearance | No change to adhesive appearance | Surface Damage | Surface Damage | Surface Damage | Surface Damage | Surface Damage |
| Subjective Tack | Low | Low | Low | Low | None | None | None | None | None |
| MEK Rub (# of double rubs) | >100 | >100 | >100 | >100 | >100 | >100 | >100 | >100 | >100 |
| 1$^{st}$ Peel Avg. g/in | 781 | 819 | 788 | 800 | 944 | 833 | 819 | 846 | 963 |
| 2$^{nd}$ Peel Avg. g/in | 519 | 586 | 567 | 590 | 668 | 377 | 576 | 622 | 556 |
| 3$^{rd}$ Peel Avg. g/in | 438 | 485 | 510 | 519 | 428 | 234 | 437 | 485 | 218 |
| 4$^{th}$ Peel Avg. g/in | 399 | 396 | 407 | 409 | 102 | 107 | 322 | 229 | 105 |
| 5$^{th}$ Peel Avg. g/in | 386 | 358 | 343 | 361 | 64 | 66 | 251 | 134 | 73 |
| Avg. Peel Strength g/in of 5 peels | 505 | 529 | 523 | 536 | 441 | 323 | 481 | 463 | 383 |

It should be noted that the average peel strength value was an average of five repeated peels on the same sample that were consecutively peeled at intervals of approximately three minutes. Therefore, the first peel was determined and the peel strength value recorded, and the reclosable fastener sample was resealed. After three minutes had passed, the reclosable fastener was peeled apart again and the peel force strength was recorded. The process was repeated until five peels were performed.

The subjective peel force, subjective tack and MEK rub test results were all good for both Samples 17 and 18 regardless of the duration of the adhesive to adhesive contact. The peel force values (i.e., initial and subsequent peels on the same sample) remained consistent for Sample 17 regardless of the duration of adhesive to adhesive contact for the range of zero days to 7 weeks. Sample 17 showed a much more consistent peel-reseal cycle than Sample 18. After the initial peel of Sample 17, the loss in adhesive to adhesive bond strength as represented by the loss in peel force upon subsequent peels was generally less than about 10% per subsequent peel, and was consistent regardless of the adhesive to adhesive contact time.

Beginning in week 3, there was a visible change in both Samples 17 and 18 (i.e., noticeable whitening and increase in opacity) upon peeling the aged samples. It is believed that this visible change is evidence of microscopic surface deformation of the adhesive due to forces acting on the adhesive surface during manual or instrumented peeling. The surface deformation did not affect the critical performance attributes of the adhesive (i.e., tack or peel strength). In the end, Sample 17 held up slightly better, with its peel strength either increasing over time, i.e., recovering peel strength, or generally maintaining about a 10% peel loss between subsequent peels.

Example 7

The inventive adhesive-based reclosable fastener Sample 17, from Example 4, was compared to three other inventive adhesive-based reclosable fasteners, Samples 39 to 41, having the formulations as indicated in Table 14.

TABLE 14

Adhesive-based Fastener Formulations

% Component Provided in Final Adhesive Formulation

| Samples | CN 111 US (Acrylic Oligomer) | Ricacryl ® 3500 (Elastomer) | CN 3211 (Tack Agent) | BR 144 (Acrylic Oligomer) | CN 2302 (Acrylic Oligomer) | Esacure ® KTO46 (Photoinitiator) | Adhesive Component Ratio (ACR) |
|---|---|---|---|---|---|---|---|
| 17 (Inventive) | 35 | 12 | 50 | 0 | 0 | 3 | 0.56 |
| 39 (Inventive) | 27 | 0 | 50 | 20 | 0 | 3 | 0.94 |
| 40 (Inventive) | 35 | 3 | 39 | 20 | 0 | 3 | 1.31 |
| 41 (Inventive) | 15 | 0 | 45 | 20 | 17 | 3 | 1.16 |

Component BR 144 is identified as an acrylic oligomer (BR 144, Bomar Specialties Company, Torrington, Conn.). Component CN 2302 is also identified as an acrylic oligomer (CN 2302, Sartomer Company). All three Samples, 39 to 41, have incorporated the acrylic oligomer BR 144, with Samples 39 and 40 having two acrylic oligomers and Sample 41 having three acrylic oligomers present in the formulation.

The adhesives were coated onto the same film substrates that were used in Example 2. Samples 39 to 41 were cured at a UV-curing station having an average line speed of about 25 ft/lain and three passes under the UV lamps totaling about 400 mJ/cm² to about 600 mJ/cm².

Coating durability of the four adhesives was tested (i.e., MEK solvent resistance test ASTM D5204) as well as initial peel strength using ASTM D3330/D3330M-04 method F. A rolling ball tack test was also performed, which was a modified version of ASTM D3121 as described in Example 4, except the sample size available for testing was about 2.5 inches wide by about 7 inches long. These results are indicated in Table 15.

TABLE 15

Test Results for Cure and Adhesion using Table 14 Formulations.

| Samples | MEK Rub Test (# of double rubs) | Initial Peel Strength-1 (gpli) | Initial Peel Strength-2 (gpli) | Average Initial Peel Strength (gpli) | Rolling Ball Distance (inches) |
|---|---|---|---|---|---|
| 17 | >100 | 184 | 191 | 188 | 1.5 |
| 39 | >100 | 698 | 733 | 716 | 6.0 |
| 40 | >100 | 341 | 333 | 337 | >7.0 |
| 41 | >100 | 336 | 289 | 313 | >7.0 |

The initial peel strength, i.e., initial peel performed under laboratory conditions, increased for the new formulations by about 30%-300% compared to Sample 17, having only one acrylic oligomer component. The rolling ball tack distance increased for the new formulations by more than 300% compared to Sample 17.

From the results, it can be seen that the new formulations having two or more acrylic oligomers had an overall improved performance compared to Sample 17, as evidenced by the rolling ball test and the peel strength test. All samples had excellent cure rates, evidenced by the MEK rub test, in particular, all of the new sample formulations, i.e., Samples 39 to 41, had lower surface tack than Sample 17 and, in particular, Samples 40 and 41 had an even better low surface tack as evidenced by the glass ball easily rolling across the surface of the reclosable fastener and off of the 7 inch long sample.

Example 8

The four inventive adhesive-based reclosable fasteners of Example 7 were tested for various repeat peel tests. The samples were initially peeled apart and opened, the peel force was measured in grains per linear inch (gpli) using ASTM test method D3330/D3330114-04 method F, then resealed for three minutes, and the peel repeated. This seal-reseal was repeated every three minutes until ten data points were obtained. The results are presented below in Table 16.

TABLE 16

Three Minute Peel Delay Test

| | Average Peel Strength (gpli) | | | |
|---|---|---|---|---|
| Peel Repetition | 17 (Inventive) | 39 (Inventive) | 40 (Inventive) | 41 (Inventive) |
| 1 | 721.4 | 371 | 710 | 388.6 |
| 2 | 525.5 | 492.4 | 501.8 | 517.2 |
| 3 | 477.8 | 477.1 | 485.8 | 442.5 |
| 4 | 443.6 | 474.2 | 459.1 | 386.7 |
| 5 | 423 | 478.1 | 449.6 | 346.3 |
| 6 | 392.9 | 480.0 | 430.2 | 313.7 |
| 7 | 374.5 | 482.5 | 411.5 | 295.4 |
| 8 | 352.6 | 504.7 | 397.4 | 255.9 |
| 9 | 332.6 | 491.8 | 381.2 | 224.3 |
| 10 | 326.6 | 490.3 | 380.9 | 204.3 |

Example 9

A 24-hour delay repeat test was performed using the same four inventive samples from Example 7. The samples were initially peeled apart and opened, the peel force required being measured. Then the samples are resealed and allowed to sit for 24 hours in a controlled environment, i.e., 72 F and 50% relative humidity (RH), until they were repeeled and opened again. This is repeated until a total of five data points have been gathered, or for a period of five days. The results are presented below in Table 17.

TABLE 17

24-Hour Peel Delay Test

| | Peel Force (gpli) | | | | |
|---|---|---|---|---|---|
| Samples | Initial Peel, Day 1 | Day 2 | Day 3 | Day 4 | Day 5 |
| 17 (Inventive) | 708.1 | 616.1 | 582.3 | 579.4 | 653.6 |
| 39 (Inventive) | 555.5 | 641.6 | 690 | 752.4 | 653 |
| 40 (Inventive) | 811.7 | 748.6 | 666 | 614.7 | 546.9 |
| 41 (Inventive) | 469.2 | 513.6 | 516.8 | 503.2 | 479 |

All four of the samples maintain their peel performance throughout the five day test period, without any sample failing below 400 gpli on any of the test days. Samples 39 and 41 actually increase in peel force and recover the initial peel force or increase in peel force during the test period. Thus, allowing these samples to remain sealed for a period of at least 24 hours allows these samples to recover or increase in adhesivity.

Example 10

In Example 10, a similar test to Example 9 was performed using the four samples described in Example 7; however, after each peel opening the adhesive area was contacted with whole coffee beans, resealed, and allowed to remain closed for 24 hours, and repeeled.

After each peel opening, whole coffee beans were placed on the adhesive surface and removed in less than five minutes. The samples were resealed and allowed to sit for 24 hours in a controlled environment, i.e., 72° F. and 50% RH, until they were repeeled and opened again. This is repeated until a total of five data points have been gathered, or for a period of five days. The results are presented below in Table 18.

TABLE 18

24-Hour Peel Delay Test After Coffee Bean Contamination

| | Average Peel Force (gpli) | | | | |
|---|---|---|---|---|---|
| Samples | Initial Peel, Day 1 | Day 2 | Day 3 | Day 4 | Day 5 |
| 17 (Inventive) | 695 | 507 | 422.1 | 344.3 | 271.5 |
| 39 (Inventive) | 627.3 | 647 | 571.2 | 458.6 | 294.9 |
| 40 (Inventive) | 770.4 | 548.3 | 412.1 | 327.3 | 230.4 |
| 41 (Inventive) | 506.9 | 476.1 | 382 | 298.3 | 211.1 |

Although the data shows a slight decrease in peel strength, the peel values still exceed 200 gpli after five peel/contamination cycles with whole coffee beans.

Example 11

A rolling ball tack test as described in Example 4 was performed on film with no adhesive for comparison to the tack values of the low tack adhesive. The results are provided below in Table 18. Roll #3 from Sample 1 took a fairly sharp turn shortly after contacting the film.

TABLE 18

Rolling Ball Tack Test On Uncoated Film

| Sample | 1 | 2 |
|---|---|---|
| Roll #1 | 16.75 | 15.875 |
| Roll #2 | 18 | 18 |
| Roll #3 | 10.875 | 14.25 |
| Roll #4 | 17.25 | 18.125 |
| Roll #5 | 20.25 | 19.875 |
| Roll #6 | 15 | |
| AVERAGE | 16.35 | 17.23 |

It will be understood that various changes in the details, materials, and arrangements of the package and process of formation thereof, which have been herein described and illustrated in order to explain the nature of the described package, may be made by those skilled in the art within the principle and scope of the embodied method as expressed in the appended claims.

What is claimed is:

1. A UV-curable pressure sensitive adhesive comprising:
a UV-curable acrylic oligomer having a positive glass transition temperature, a separate tack control component, and optionally at least one separate elastomeric material;
an adhesive component ratio (ACR) of the pressure sensitive adhesive defined by formula (A) where the weight percent of the UV-curable acrylic oligomer relative to the sum of the weight percents of the tack control component and the elastomeric material is about 0.5 to about 1.5

$$\frac{(UV\text{-curable acrylic oligomer})}{(\text{tack control component} + \text{elastomeric material})}; \quad (A)$$

the ACR effective so that a UV-cured pressure sensitive adhesive forms a first peel adhesion between opposing strips of the UV-curable pressure sensitive adhesive of about 200 to about 900 grams per linear inch (gpli) and up to five subsequent peel adhesions each about 30 to about 200 percent of the first peel adhesion and a first subsequent peel adhesion after fouling with debris at least about 50 percent of the first peel adhesion;
a liquid mixture of the UV-curable acrylic oligomer, the tack control component, and the optional elastomeric material are compatible such that the liquid mixture remains a stable liquid that is homogeneous without phase separation for at least about 3 days at about 70 to about 75° F.; and
wherein the tack control component is an aliphatic urethane acrylate oligomer.

2. The pressure sensitive adhesive of claim 1, wherein the pressure sensitive adhesive includes about 1 to about 90 percent of the UV-curable acrylic oligomer, about 1 to about 65 percent of the tack control component, and about 5 to about 20 percent of the elastomeric material.

3. The pressure sensitive adhesive of claim 1, wherein the UV-curable acrylic oligomer having the positive glass transition temperature is an acrylic acid ester.

4. The pressure sensitive adhesive of claim 3, wherein the acrylic acid ester is an acrylic acid ester of a vegetable oil.

5. The pressure sensitive adhesive of claim 1, wherein the elastomeric material includes one of curable elastomeric acrylate esters or methacrylate esters of a hydroxyl-terminated elastomeric polymer selected from the group consisting of polybutadiene, saturated polybutadiene, and polyurethane.

6. The pressure sensitive adhesive of claim 1, wherein the adhesive has a viscosity below about 50,000 cPs at about 70 to about 75° F.

7. The pressure sensitive adhesive of claim 6, wherein the viscosity is about 5000 cPs or less at about 160° F.

8. The pressure sensitive adhesive of claim 1, wherein the adhesive is cured with ultraviolet radiation supplied at an energy between about 100 and about 800 mJ/cm$^2$ so that the UV-cured pressure sensitive adhesive withstands at least 100 double rubs with methyl ethyl ketone.

9. The pressure sensitive adhesive of claim 1, wherein the adhesive exhibits a rolling ball tack between about 4 to about 14 inches.

10. The pressure sensitive adhesive of claim 1, wherein the UV-curable acrylic oligomer having the positive glass transition temperature is an acrylic or meth-acrylic acid ester.

11. The pressure sensitive adhesive of claim 1, wherein the UV-curable acrylic oligomer having the positive glass transition temperature is selected from the group consisting of an acrylic or meth-acrylic acid ester of a multifunctional alcohol, an acrylated epoxidized soybean oil, a polyester acrylic oligomer, a polyether urethane acrylate oligomer, and combinations thereof.

12. A UV-curable pressure sensitive adhesive comprising:
   a UV-curable acrylic oligomer having a positive glass transition temperature, a separate tack control component, and optionally at least one separate elastomeric material;
   an adhesive component ratio (ACR) of the pressure sensitive adhesive defined by formula (A) where the weight percent of the UV-curable acrylic oligomer relative to the sum of the weight percents of the tack control component and the elastomeric material is about 0.5 to about 1.5

$$\frac{\text{(UV-curable acrylic oligomer)}}{\text{(tack control component + elastomeric material)}}; \quad (A)$$

the ACR effective so that a UV-cured pressure sensitive adhesive forms a first peel adhesion between opposing strips of the UV-curable pressure sensitive adhesive of about 200 to about 900 grams per linear inch (gpli) and up to five subsequent peel adhesions each about 30 to about 200 percent of the first peel adhesion; and
   a liquid mixture of the UV-curable acrylic oligomer, the tack control component, and the optional elastomeric material are compatible such that the liquid mixture remains a stable liquid that is homogeneous without phase separation for at least about 3 days at about 70 to about 75° F.; and
   wherein the tack control component is an aliphatic urethane acrylate oligomer.

13. The pressure sensitive adhesive of claim 12, wherein the pressure sensitive adhesive includes about 1 to about 90 percent of the UV-curable acrylic oligomer, about 1 to about 65 percent of the tack control component, and about 5 to about 20 percent of the elastomeric material.

14. The pressure sensitive adhesive of claim 12, wherein the UV-curable acrylic oligomer having the positive glass transition temperature is an acrylic acid ester.

15. The pressure sensitive adhesive of claim 14, wherein the acrylic acid ester is an acrylic acid ester of a vegetable oil.

16. The pressure sensitive adhesive of claim 12, wherein the elastomeric material includes one of curable elastomeric acrylate esters or methacrylate esters of a hydroxyl-terminated elastomeric polymer selected from the group consisting of polybutadiene, saturated polybutadiene, and polyurethane.

17. The pressure sensitive adhesive of claim 12, wherein the adhesive has a viscosity below about 50,000 cPs at about 70 to about 75° F.

18. The pressure sensitive adhesive of claim 17, wherein the viscosity is about 5000 cPs or less at about 160° F.

19. The pressure sensitive adhesive of claim 12, wherein the adhesive is cured with ultraviolet radiation supplied at an energy between about 100 and about 800 mJ/cm$^2$ so that the UV-cured pressure sensitive adhesive withstands at least 100 double rubs with methyl ethyl ketone.

20. The pressure sensitive adhesive of claim 12, wherein the adhesive exhibits a rolling ball tack between about 4 to about 14 inches.

21. The pressure sensitive adhesive of claim 12, wherein the UV-curable acrylic oligomer having the positive glass transition temperature is selected from the group consisting of an acrylic or meth-acrylic acid ester of a multifunctional alcohol, an acrylated epoxidized soybean oil, a polyester acrylic oligomer, a polyether urethane acrylate oligomer, and combinations thereof.

* * * * *